(12) United States Patent
Ueda et al.

(10) Patent No.: US 10,768,021 B2
(45) Date of Patent: Sep. 8, 2020

(54) POSITION DETECTION DEVICE AND POSITION DETECTION METHOD

(71) Applicant: Yamaha Corporation, Hamamatsu, Shizuoka (JP)

(72) Inventors: Taku Ueda, Shizuoka (JP); Yoshihiro Suzuki, Shizuoka (JP); Yoshihiro Natsume, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 185 days.

(21) Appl. No.: 16/134,729

(22) Filed: Sep. 18, 2018

(65) Prior Publication Data

US 2019/0025092 A1 Jan. 24, 2019

Related U.S. Application Data

(63) Continuation of application No. PCT/JP2017/012026, filed on Mar. 24, 2017.

(30) Foreign Application Priority Data

Mar. 25, 2016 (JP) ................................. 2016-062748

(51) Int. Cl.
*G01D 5/245* (2006.01)
*G01D 5/241* (2006.01)

(52) U.S. Cl.
CPC ........... *G01D 5/245* (2013.01); *G01D 5/2415* (2013.01)

(58) Field of Classification Search
CPC ............................. G01D 5/245; G01D 5/2415
See application file for complete search history.

(56) References Cited

U.S. PATENT DOCUMENTS 5,477,621 A * 12/1995 Koizumi ............. G01D 5/2415
                                                    29/592.1
2005/0092108 A1* 5/2005 Andermo ............ G01D 5/2415
                                                    73/862.626

FOREIGN PATENT DOCUMENTS

JP       S63-71611 A      4/1988
JP       2005-221472 A    8/2005
                    (Continued)

OTHER PUBLICATIONS

International Search Report in PCT/JP2017/012026 dated Jun. 27, 2017.
(Continued)

*Primary Examiner* — Ryan D Walsh
(74) *Attorney, Agent, or Firm* — Global IP Counselors, LLP

(57) ABSTRACT

A position detection device includes a fixed element, a movable element, a plurality of first electrodes, a second electrode, a third electrode and a first detection circuit. The movable element is movable relative to the fixed element. The first electrodes are arranged on either the fixed element or the movable element, and the second electrode is on the other of the movable element or the fixed element. The first electrodes include two or more phases with electrical signals having mutually different phases. The third electrode is provided on the fixed element and opposing the electrode that is on the movable element while the movable element is in a prescribed position. The first detection circuit detects when the movable element is in the prescribed position based on electrical signals generated in the second and third electrodes in accordance with the electrical signals supplied to the first electrodes.

17 Claims, 12 Drawing Sheets

(56) References Cited

FOREIGN PATENT DOCUMENTS

| | | |
|---|---|---|
| JP | 2011-047679 A | 3/2011 |
| JP | 2011-095034 A | 5/2011 |
| JP | 2011-185882 A | 9/2011 |

OTHER PUBLICATIONS

Translation of Office Action in the corresponding Japanese Patent Application No. 2016-062748, dated Feb. 12, 2020.
Translation of Office Action in the corresponding Chinese Patent Application No. 201780019709.8, dated Apr. 22, 2020.

* cited by examiner

POSITION DETECTION DEVICE AND POSITION DETECTION METHOD

CROSS-REFERENCE TO RELATED APPLICATIONS

This application is a continuation application of International Application No. PCT/JP2017/012026, filed Mar. 24, 2017, which claims priority to Japanese Patent Application No. 2016-062748 filed in Japan on Mar. 25, 2016. The entire disclosures of International Application No. PCT/JP2017/012026 and Japanese Patent Application No. 2016-062748 are hereby incorporated herein by reference.

BACKGROUND

Technological Field

The present invention relates to a position detection device that detects the relative positions of a fixed element and a movable element that moves on the fixed element, as well as a position detection method for such a position detection device.

Background Technology

Various position detection devices have been proposed for detecting the relative positions of a movable element that moves on a fixed element. For example, Japanese Laid-Open Patent Application No. 2005-221472 (Patent Document 1) discloses supplying a voltage to an induction electrode of a fixed element to generate an alternating potential distribution in a comb-shaped electrode of a movable element by means of electrostatic induction, detecting the alternating potential distribution using a voltage detection electrode of the fixed element to generate a vector having two signals as components and measuring the potential of the movable element referenced to the fixed element from the rotation angle of the vector.

In addition, Japanese Laid-Open Patent Publication No. 2011-47679 (Patent Document 2) discloses supplying four electrical signals shifted in phase by 90 degrees to four phase electrodes on a fixed element and measuring the position of the movable element relative to the fixed element on the basis of the phases of the signals that are thereby induced in a first electrode and a second electrode on the movable element. Japanese Laid-Open Patent Publication No. Sho 63 (1988)-71611 (Patent Document 3) discloses disposing a random pattern for origin detection in the vicinity of a main scale and setting a mechanical origin in accordance with the detection of the random pattern.

SUMMARY

However, in the position detection devices of Patent Documents 1 and 2, there is no particular mention of a method for setting a position that acts as a reference for position measurements, when the range of possible movement of the movable element is increased and a large number of electrodes are used. In addition, in the technique disclosed in Patent Document 3, a detector for reading the random pattern is required in addition to a detector for reading the main scale in order to set the mechanical origin, so that there are the problems of high cost and a complicated configuration.

An object of the present invention is to solve such problems and to make it possible to accurately set a reference for detecting the position of a movable element with a simple configuration, even if the range of possible movement of the movable element is increased.

In order to realize the object described above, a position detection device is proposed that basically comprises a fixed element, a movable element, a plurality of first electrodes, a second electrode, a third electrode and a first detection circuit. The movable element is movably arranged relative to the fixed element. The first electrodes arranged one-dimensionally on either the fixed element or the movable element in a plane along a movement direction of the movable element. The first electrodes include two or more phases to which are respectively supplied with electrical signals having mutually different phases. The second electrode is provided on the other one of the movable element or the fixed element to be at least partially opposed to the first electrodes. The third electrode is provided on the fixed element and opposing one of the first and second electrodes that is on the movable element while the movable element is in a prescribed position. The first detection circuit is configured to detect that the movable element is in the prescribed position based on an intensity of an electrical signal that is generated in the third electrode and a phase of an electrical signal that is generated in the second electrode in accordance with the electrical signals supplied to the first electrodes.

In addition, another position detection device is proposed that basically comprises a fixed element, a movable element, a plurality of first electrodes, a second electrode, a third electrode and a first detection circuit. The movable element is movably arranged relative to the fixed element. The first electrodes arranged one-dimensionally on either the fixed element or the movable element in a plane along a movement direction of the movable element. The first electrodes include two or more phases to which are respectively supplied with electrical signals having mutually different phases. The second electrode is provided on the other one of the movable element or the fixed element to be at least partially opposed to the first electrodes. The second electrode is arranged to be at least partially generate an electrical signal by the electrical signals being supplied to at least a part of the first electrodes. The third electrode is provided on the fixed element. The third electrode is arranged to be at least partially generate an electrical signal with an intensity corresponding to a distance from one of the first and second electrodes that is provided on the movable element, by the electrical signals that are generated in the first and second electrodes that is provided on the movable element. The first detection circuit is configured to detect that the movable element is in the prescribed position based on an intensity of the electrical signal that is generated in the third electrode and a phase of the electrical signal that is generated in the second electrode in accordance with the electrical signals supplied to the first electrodes.

In the position detection devices described above, the third electrode is preferably provided adjacent an end portion of an array of the first electrodes or adjacent an end portion of the second electrode.

Furthermore, in the position detection devices described above, a second detection circuit, a driving source and an electronic controller are preferably provided. The second detection circuit is configured to detect an amount of movement and position of the movable element based on the phase of the electrical signal that is generated in the second electrode in accordance with the electrical signals supplied to the first electrodes. The driving source is operatively coupled to the movable element. The electronic controller is configured to operate the drive source to move the movable element adjacent to the prescribed position in response to a prescribed event. The electronic controller is also configured to set a position detection reference for position detection of the movable element by the second detection circuit in accordance with a timing at which the first detection circuit that the movable element is in the prescribed position.

Furthermore, the electronic controller is preferably configured to control the driving source to move the movable element to a position indicated by a parameter value corresponding to the movable element after the position detection reference has been set. The electronic controller is also configured to change the parameter value in accordance with the position of the movable element as detected by the second detection circuit. The electronic controller is also configured to invalidate the change in the parameter value while the movable element is being moved by the drive source.

Furthermore, in the position detection devices described above, a second detection circuit and an electronic controller are preferably provided. The second detection circuit is configured to detect an amount of movement and position of the movable element based on the phase of the electrical signal that is generated in the second electrode in accordance with the electrical signals supplied to the first electrodes. The electronic controller is configured to set a position detection reference for the position detection of the movable element by the second detection circuit in accordance with a timing at which the first detection circuit detects that the movable element is in the prescribed position.

Furthermore, the electronic controller is preferably is configured to change a parameter value in accordance with the position of the movable element as detected by the second detection circuit, and after a prescribed event is detected, the electronic controller is configured to refrain from changing the parameter value until the position detection reference is set and the movable element is then moved to a position indicated by a parameter corresponding to the movable element.

In addition to implementation as a device, as described above, the present invention can be implemented in a variety of forms, e.g., as a system, a method, a program, or a storage medium.

According to the configuration of the present invention as described above, it is possible to accurately set a reference for detecting the position of a movable element with a simple configuration, even if the range of possible movement of the movable element is increased.

DETAILED DESCRIPTION OF THE EMBODIMENTS

Selected embodiments will now be explained with reference to the drawings. It will be apparent to those skilled in the position detection field and the substrate field from this disclosure that the following descriptions of the embodiments are provided for illustration only and not for the purpose of limiting the invention as defined by the appended claims and their equivalents.

Figure 3:
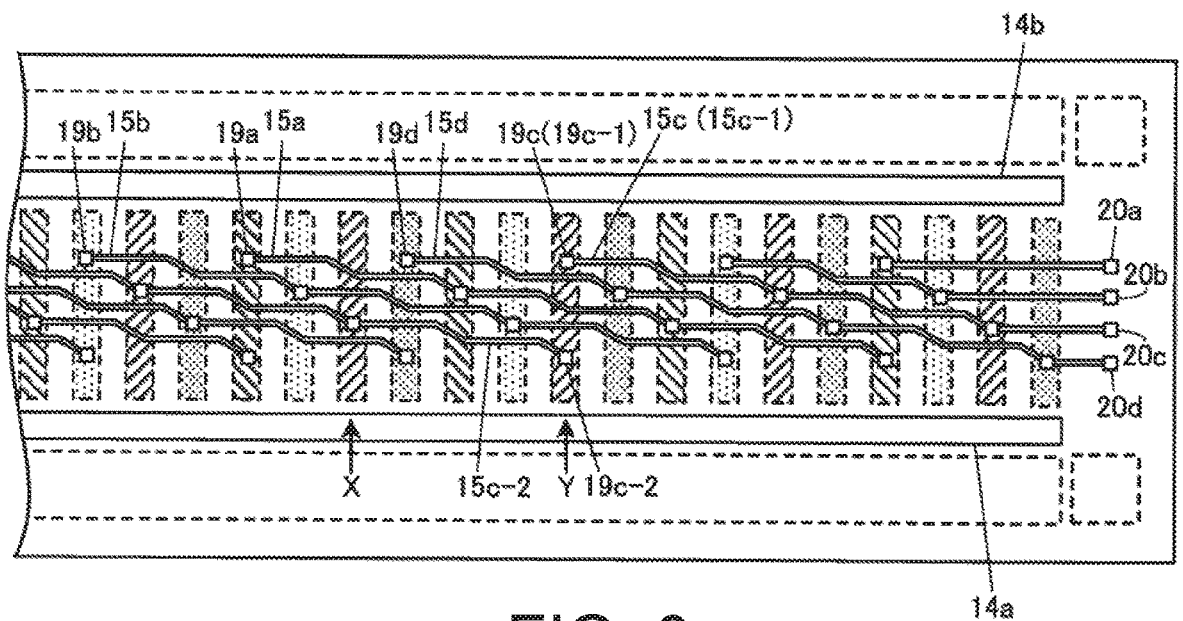
FIG. 3 is a bottom plan view of the substrate shown in FIG. 1.
Figure 4:
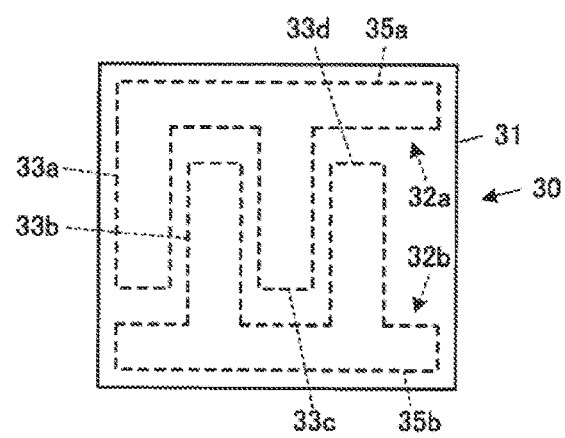
FIG. 4 is a top plan view of a movable element that is disposed on the substrate shown in FIG. 1.
Figure 5:
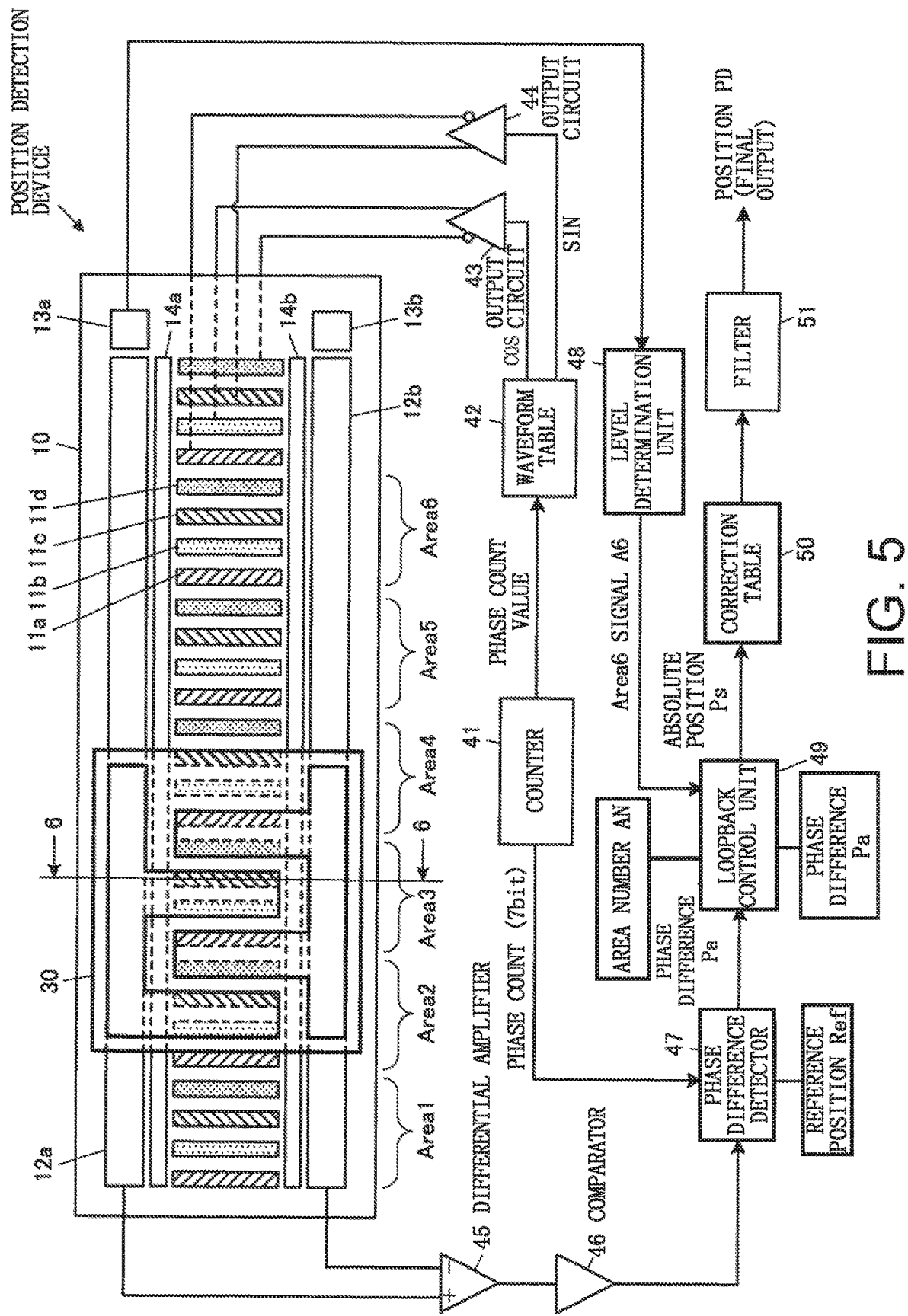
FIG. 5 is a schematic view showing a schematic overview of the position detection device according to one embodiment.

Referring to FIGS. 1 to 8, a first embodiment of a position detection device and a substrate will now be described. FIG. 5 shows a schematic overview including a detection circuit of the position detection device according to the first embodiment.

The position detection device 1 shown in FIG. 5 is an embodiment that basically comprises a substrate 10 (e.g., a printed-circuit board) and a movable element 30 (small printed-circuit board). The substrate 10 is a fixed element, while the movable element 30 moves on the substrate 10. The position detection device 1 is configured to detect and output the position of the movable element 30 on the substrate 10. The position of the movable element 30 that is detected by the position detection device 1 is the position of the movable element 30 relative to the substrate 10, which is referred to as the absolute position. In addition, the movement path of the movable element 30 is restricted to an appropriate one-dimensional range on the substrate 10 by an appropriate, known method.

Figure 1:
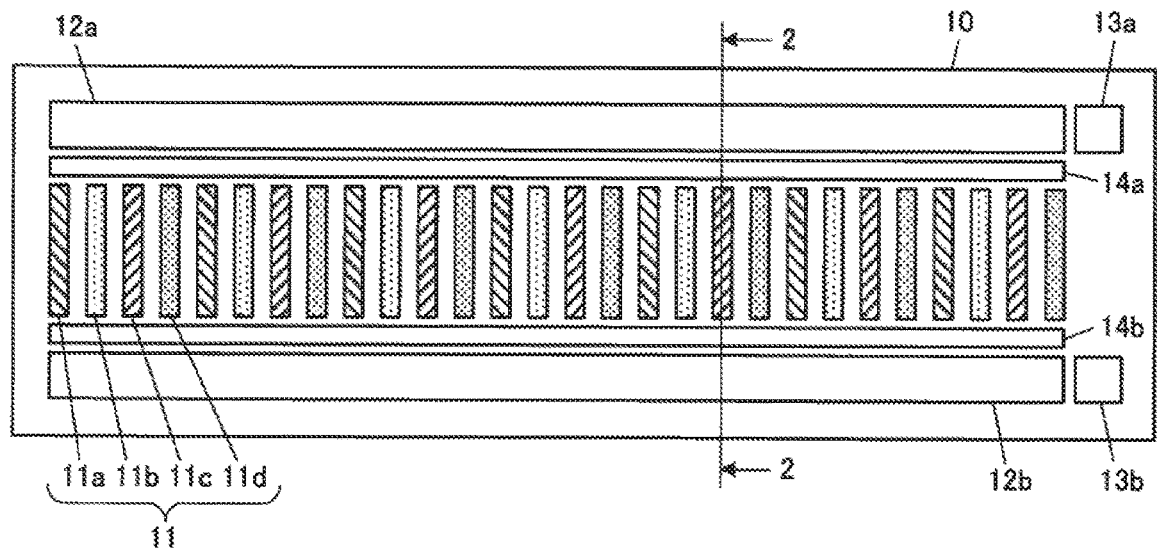
FIG. 1 is a top plan view of a substrate provided in a position detection device according to one embodiment.
Figure 2:
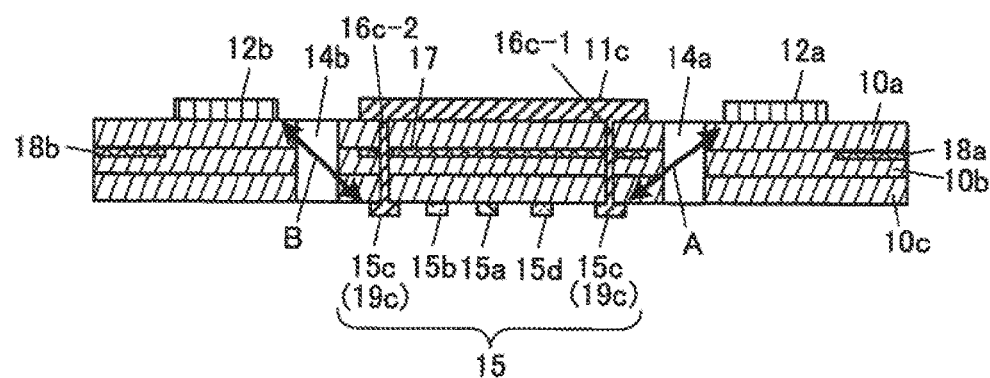
FIG. 2 is a cross-sectional view of the substrate taken along section line 2-2 in FIG. 1.

Here, substrate 10 will be described first with reference to FIGS. 1 to 3. FIG. 1 is a plan view of the substrate 10. FIG. 2 is a cross-sectional view taken along line 2-2 of FIG. 1 FIG. 3 is a bottom surface view showing the arrangement of the wiring electrodes on the rear surface of substrate 1. Substrate 10 shown in FIG. 1 is a hard substrate that does not readily deform, formed from an insulating material, such as resin. In addition, although the substrate has a three-layer structure, comprising a first layer 10a to a third layer 10c, as shown in FIG. 2, the material of each layer may be the same or different. In addition, various electrodes and wirings are printed on each layer, which are superposed and bonded. Substrate 10 need not be formed from a plurality of layers but can be formed from only one layer.

Provided on a first surface of the substrate 10 on the front side in FIG. 1 are a signal electrode 11, extraction electrodes 12a, 12b, and reference position electrodes 13a, 13b. In addition, an air gap 14a is provided between the signal electrode 11 and the extraction electrode 12a, and an air gap 14b is provided between the signal electrode 11 and the extraction electrode 12b. These elements 11-14 (and the wiring 15 and via 19, etc., which are described below) are substrate-side elements for detecting the position of one movable element 30. If the substrate 10 is sufficiently wide, it is possible to provide on a single substrate 10 a plurality of substrate-side elements 11-19 that correspond to a plurality of movable elements 30 in order to measure the position of each movable element 30.

The signal electrode 11 is a first electrode in which a plurality of electrodes, to which are supplied four-phase electrical signals that are successively shifted in phase by 90 degrees, are repeatedly arranged in a one-dimensional manner in the movement direction of the movable element 30. For example, a first phase electrode 11a to which the first phase (+0°) signal is supplied, a second phase electrode 11b to which the second phase (+90°) signal is supplied, a third phase electrode 11c to which the third phase (+180°) signal is supplied, and a fourth phase electrode 11d to which the fourth phase (+270°) signal is supplied, are repeatedly arranged in this order. The hatching (dots, diagonal lines) for the electrodes in the drawing indicates the phase for each electrode. Electrodes with the same hatching are electrodes with the same phase.

The extraction electrodes 12a, 12b are electrodes that are respectively provided adjacent the two sides of the signal electrode 11 and that are used to extract electrical signals that are induced in the electrodes on the movable element 30 side by using capacitive coupling, in accordance with the electrical signal that is supplied to the signal electrode 11. The mechanism of this extraction will be described in detail further below. The reference position electrodes 13a, 13b are third electrodes provided adjacent the end portions of the extraction electrodes 12a, 12b, and that are used to extract electrical signals that are induced in the electrodes on the movable element 30 side when the movable element 30 is in Area 6 shown in FIG. 5. The mechanism of this extraction will also be described in detail further below.

As shown in FIG. 2, the air gaps 14a, 14b are provided as elongated through-holes, i.e., slits that pass through the first layer 10a through the third layer 10c of the substrate 10. The widths thereof are substantially uniform over their entire length. These air gaps 14a, 14b are provided for reducing the propagation of signals via direct capacitive coupling from the signal electrode 11 to the extraction electrode 12. That is, because there is direct capacitive coupling between the signal electrode 11 and the extraction electrode 12, which depends on the substrate material (in the sense that the propagation is not via the electrodes of the movable element 30, which is described below), if an AC signal is supplied to the signal electrode 11, the signal is propagated to the extraction electrode 12 by using direct capacitive coupling, regardless of the position of the electrodes on the movable element 30 side. This signal turns into noise during detection of the position of the movable element 30. In addition, the intensity of the propagated signal is inversely proportional to the capacitive reactance (resistance component) that is directly formed between the signal electrode 11 and the extraction electrode 12.

Therefore, by interposing a low-dielectric constant portion with a relatively lower dielectric constant than the substrate between the signal electrode 11 and the extraction electrode 12 (reference numeral "12" is used when individual electrodes are not distinguished), thereby increasing the capacitive reactance (decreasing the electrostatic capacitance), signal propagation can be suppressed. In the example of FIG. 1, air gaps 14a, 14b are provided for the purpose of interposing air, which has a lower relative dielectric constant than resin (having a relative dielectric constant of 2-4, for example), which is the material of the substrate 10. However, the same effect can be achieved by using a filling material that has a lower relative dielectric constant than the material of the substrate 10.

Thus, it is possible to suppress direct propagation of signals from the signal electrode 11 to the extraction electrode 12, and to detect the position of the movable element 30 accurately, even if the range of possible movement of the movable element is set to be wide, and the number of signal electrodes 11 is thereby increased. Although the capacitive reactance can also be increased by increasing the distance between the signal electrode 11 and the extraction electrode 12, if the distance becomes too great, the size of the position detection device 1 increases. It is preferable to use a moderate length and provide air gaps 14a, 14b, as in this embodiment.

Moreover, if a reduction in the capacitive coupling described above is intended, the desired effect can be achieved to a certain extent by providing, as air gaps, for example, grooves that penetrate the first layer 10a and the second layer 10b, instead of a through-hole. However, it is preferable to provide a through-hole for the following reasons. That is, it is known that if substrate 10 is placed in an environment with a humidity of about 90% or more, fine water droplets that are not readily discerned by the naked eye form on the surface of the substrate 10. The resistance component between the signal electrode 11 and the extraction electrode 12 is decreased due to these water droplets, and signals propagate via the path formed thereby. These signals also represent noise during detection of the position of the movable element 30.

However, if the air gaps 14a, 14b are made up of through-holes between the signal electrode 11 and the extraction electrode 12, the propagation of signals can be prevented even if water droplets form on the surface of the substrate 10, since the conduction path between the signal electrode 11 and the extraction electrode 12 is relatively long. Therefore, the position detection device 1 is able to detect the position of the movable element 30 accurately, even in a high-humidity environment.

Next, electrodes provided inside the substrate 10 and on a second surface on the rear side of the first surface (the front side surface in FIG. 3) will be described. As shown in FIG. 3, the wiring 15, the via 19, and the terminal 20 are provided on the second surface of the substrate 10. For the wiring 15, the reference numeral "15" without an alphabetic character is used when it is not necessary to distinguish between the phases. Likewise, an alphabetic character is not used with "the via 19," "the terminal 20," and "the barrel 16" when it is not necessary to distinguish between the phases.

The wiring 15 electrically connects a plurality of the signal electrodes 11 of the same phase and supplies electrical signals to each of the signal electrodes 11. The vias 19 are connection portions for electrically connecting two electrodes on two different surfaces (the wiring 15 and the signal electrode 11, for example) via the barrel 16 provided in a through-hole that passes through the substrate 10, as shown in FIG. 2. The terminals 20 electrically connect the wiring 15 to an external circuit.

FIG. 3 shows a location (the location indicated by arrow X, for example) where one of the vias 19 is provided and a location (the location indicated by the arrow Y, for example) where two of the vias 19 are provided, which overlap one of the signal electrodes 11 in a plan view (when viewed from a direction perpendicular to the substrate 10).

Figure 6:
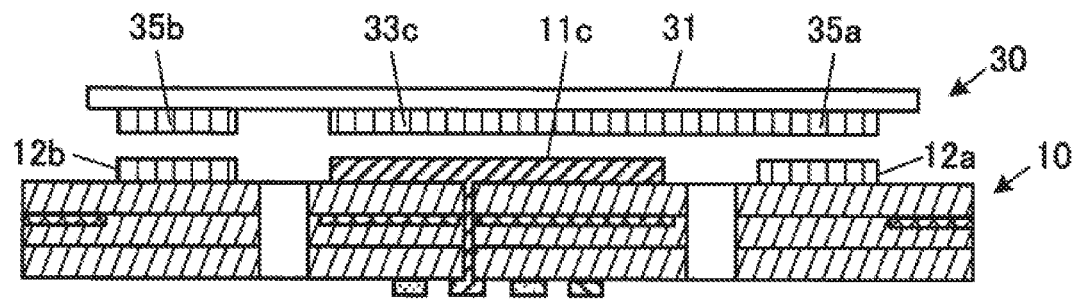
FIG. 6 is a cross-sectional view of the position detection device taken along section line 6-6 in FIG. 5.

In the former location, the wiring 15 is simply connected to the signal electrode 11 (refer to FIG. 6). However, in the latter location, the wiring 15 for one phase is divided into two partial wirings, on the left and right, the first partial wiring 15c-1 is connected to the signal electrode 11 through a first connection portion (the via 19c-1) and is further connected to the second partial wiring 15c-2 through a second connection portion (the via 19c-2). The second partial wiring 15c-2 is connected to each subsequent one of the signal electrodes 11.

The substrate 10 is provided with four-phase wirings 15a-15d, corresponding to the four-phase signal electrodes 11. Then, as shown in FIG. 3, the arrangement of the wiring 15 of each phase in the vertical direction in FIG. 3 is alternatingly replaced, such that the wiring 15 of different phase arrive at positions that are closest to the extraction electrode 12 among the four-phases of the wirings 15, in accordance with the position in the arrangement direction of the signal electrode 11. Due to this replacement, a location where two of the vias 19 are provided in a position that overlaps one signal electrode 11 in a plan view is provided when one wiring crosses another wiring.

In addition, the wiring 15 of each phase is configured to be in a position closest to the extraction electrode 12 among the four-phases of the wirings 15 at intervals that are substantially equal in length when seen in the arrangement direction of the signal electrodes 11. A "position closest to the extraction electrode 12" includes a "position closest to the extraction electrode 12a" and a "position closest to the extraction electrode 12b," but in either case, it is preferable if the "intervals that are substantially equal in length" above holds true.

Here, direct capacitive coupling such as that indicated by arrow A is formed between the extraction electrode 12a and the wiring 15 that is in a position closest to the extraction electrode 12a. In the same manner, direct capacitive coupling such as that indicated by arrow B is formed between the extraction electrode 12b and the wiring 15 that is in a position closest to the extraction electrode 12b. Then, AC signals that are supplied to the wiring 15 via these capacitive couplings are propagated to the extraction electrodes 12a, 12b, which represent noise during detection of the position of the movable element 30.

In particular, if only the wiring 15 of a specific phase is in a location closest to the extraction electrode 12, electrical signals of a specific phase will be supplied to the extraction electrode 12. Consequently, there is a significant effect on the position detection of the movable element 30 that is based on the phase of electrical signals, as described below. However, if wirings 15 of different phase are in positions closest to the extraction electrode 12 depending on the position in the arrangement direction of the signal electrode, signals of a plurality of phases will be propagated along the extraction electrode 12; therefore, signals of opposite phase will cancel each other out along the extraction electrode 12, and it becomes possible to reduce the overall influence of the propagated signals from the wiring 15. If the wiring 15 of each phase is configured to be in a position closest to the extraction electrode 12 at intervals that are substantially equal in length when seen in the arrangement direction of the signal electrodes 11, this effect becomes more pronounced.

In addition to the foregoing, a plurality of shielding electrodes 17, 18a, 18b are provided on the second layer 10b within the substrate 10. The shielding electrodes 17, 18a, 18b are connected to ground and function as elements that provide shielding against the propagation of electrical signals.

The shielding electrode 17 is provided in a location which, in a plan view, overlaps the area in which the signal electrode 11 is disposed, and is provided in order to prevent the propagation of electrical signals between the signal electrode 11, on the one hand, and the wiring 15 and the via 19, on the other, that do not pass through the barrel 16. A shielding electrode 17 is not provided in the position of the barrel 16, and a hole (antipad) that is slightly larger than the barrel 16 is provided on the shielding electrode 17, such that the shielding electrode 17 and the barrel 16 do not come into contact.

In addition, the shielding electrodes 18a, 18b are provided in order to prevent the propagation of noise signals from the outside to the respective extraction electrodes 12a, 12b. However, the shielding electrodes 18a, 18b are provided to avoid locations that overlap the extraction electrodes 12a, 12b in a plan view. This is because, if they are provided in positions that overlap in a plan view, the capacitive coupling indicated by arrow A and arrow B increases, and leakage from the wiring 15 to the extraction electrodes 12a, 12b increases.

Next, the movable element 30 will be described with reference to FIGS. 4 to 6. FIG. 4 is a plan view of a movable element 30.

The movable element 30 is formed by arranging (printing) a pair of movable element electrodes 32a, 32b, which are second electrodes, on the rear side surface of the substrate 31 in FIG. 4. The movable element electrode 32a comprises a first opposing portion 33a and a third opposing portion 33c, which respectively oppose the signal electrode 11, and a signal extracting portion 35a that opposes the extraction electrode 12a. In addition, the movable element electrode 32b comprises a second opposing portion 33b and a fourth opposing portion 33d, which respectively oppose the signal electrode 11, and a signal extracting portion 35b that opposes the extraction electrode 12b.

FIG. 5 shows a state in which the movable element 30 is disposed on the substrate 10. FIG. 6 is a cross-sectional view taken along line 6-6 of FIG. 5. In FIG. 5, the movable element electrodes 32a, 32b are on the rear side of the substrate 31 but are indicated by solid lines for clarity of illustration.

As shown in FIG. 5, the first opposing portion 33a and the third opposing portion 33c of the movable element electrode 32a oppose an electrode of one phase of the signal electrode 11 depending on the position of the movable element 30 and are dimensioned such that they oppose electrodes of the same phase that are separated by exactly one cycle.

Additionally, if an electrical signal is applied to the signal electrode 11, electrical signals are thus also induced in the first opposing portion 33a and the third opposing portion 33c due to capacitive coupling. Because they oppose electrodes of the same phase, electrical signals of the same phase are induced in the first opposing portion 33a and the third opposing portion 33c. These electrical signals propagate to the signal extracting portion 35a. Due to the occurrence of electrical signals in the signal extracting portion 35a, electrical signals are also induced, due to capacitive coupling, in the extraction electrode 12a, which opposes the signal extracting portion 35a.

The electrical signals induced in the extraction electrode 12a have a different phase depending on which phase signal electrode 11 the first opposing portion 33a and the third opposing portion 33c are opposite to, that is, depending on the position of the movable element 30. For example, if the first opposing portion 33a and the third opposing portion 33c are in positions that are opposite only the first phase electrode 11a, an electrical signal of the same phase as the first phase is induced in the extraction electrode 12a. In addition, if the position just covers both the second phase electrode 11b and the third phase electrode 11c, as illustrated in FIG. 5, a phase that is intermediate between the second phase and the third phase (phase of a signal obtained by adding the signals of the second phase and third phase) is induced in the extraction electrode 12a.

Similarly, even when in other positions, a signal whose phase varies continuously in accordance with the position of the movable element 30 is induced in the extraction electrode 12a. In addition, the phase changes 360° (corresponding to one cycle) each time the movable element 30 moves a distance corresponding to signal electrodes 11 for four phases, that is, one area indicated by "Area" in FIG. 5. Thus, it is possible to detect the position of the movable element 30 within each region based on the phase of the electrical signal that is generated in the extraction electrode 12a.

The same relationship also exists between the second opposing portion 33b and fourth opposing portion 33d of the movable element electrode 32b, the signal electrode 11, and the extraction electrode 12b. However, the signal electrode 11 that opposes the second opposing portion 33b and the fourth opposing portion 33d is an electrode of a different phase that is shifted by two phases from the signal electrode that opposes the first opposing portion 33a and the third opposing portion 33c. For example, when the phases of the electrical signals of the respective phases differ by 90°, they will oppose the signal electrode 11 of opposite phase, compared to the case of the first opposing portion 33a and the third opposing portion 33c. Thus, the electrical signal induced in the extraction electrode 12b is an electrical signal of opposite phase of the signal induced in the extraction electrode 12a, and by taking the difference between these the signal is amplified, whereas noise signals that are common to the two extraction electrodes 12a, 12b cancel out, thereby improving the detection accuracy of the position of the movable element 30.

In addition, for the sake of convenience, the "Areas" mentioned above shall be divided with reference to the position of the first opposing portion 33a and the position where the center of the first opposing portion 33a overlaps the center of the first phase electrode 11a shall be the break between the areas. In the position detection device 1, six areas are provided, "Area1" to "Area6."

Figure 7:
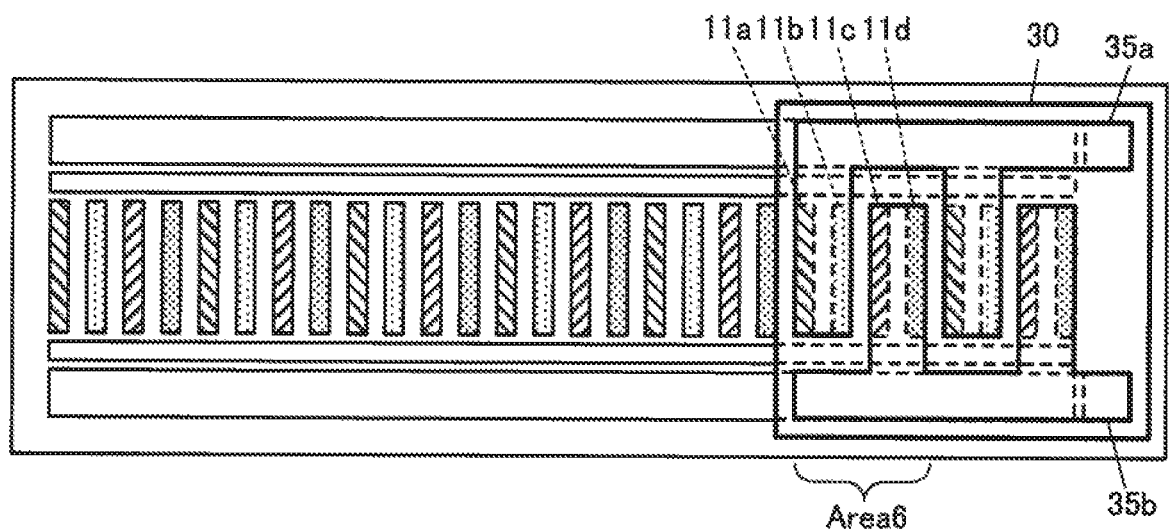
FIG. 7 is a top plan view of the position detection device showing a state in which the movable element is at the right end of the range of possible movement in the position detection device.

Here, for example, as illustrated in FIG. 7, if the movable element 30 is in "Area6," the signal extracting portions 35a, 35b oppose not only the extraction electrodes 12a, 12b, but also the reference position electrodes 13a, 13b. Therefore, electrical signals town extent that can be detected are induced in the reference position electrodes 13a, 13b due to capacitive coupling via the signal extracting portions 35a, 35b, only when the movable element 30 is in "Area6."

On the other hand, when the movable element is not in "Area6," only weak electrical signals are induced. This is because electrical signals of an intensity corresponding to the distance between the signal extracting portions 35a, 35b and the reference position electrodes 13a, 13b are induced in the reference position electrodes 13a, 13b in response to electrical signals being generated in the signal extracting portions 35a, 35b.

Thus, when electrical signals of at least a prescribed intensity are output from the reference position electrodes 13a, 13b, the movable element 30 is in "Area6." By combining this with the phase of the electrical signals from the extraction electrodes 12a, 12b, it is possible to specify the position of the movable element 30 within "Area6."

The position of "Area6," that is, the position in which the reference position electrodes 13a, 13b are provided, is not limited to this example, and can be provided anywhere. In this case, it is possible to provide the reference position electrodes 13a, 13b, for example, on the outside of the extraction electrodes 12a, 12b, and the signal extracting portions 35a, 35b can be provided extended to the outside of the extraction electrodes 12a, 12b. However, it is possible to save space by providing the reference position electrodes 13a, 13b on the extended line of the extraction electrodes 12a, 12b, as in this example.

In addition, it is not necessary for an electrical signal of at least a prescribed intensity to be output from the reference position electrodes 13a, 13b in all the positions of "Area6" (it is also not necessary for the signal extracting portions 35a, 35b to oppose the reference position electrodes 13a, 13b), and the configuration may be such that electrical signals of at least a prescribed intensity are output only when on a portion of the right side in the drawing. In order to avoid an erroneous determination of "Area6" when the signal is in the adjacent "Area5," it can be said that this "only a portion" configuration is preferable.

In addition, although it is sufficient if only one of the reference position electrodes 13a, 13b is provided, the reason that two are provided is to make the signal leakage from the two signal extracting portions 35a, 35b to the reference position electrode equal, and to make the influence of two of the extraction electrodes 12a, 12b on the two electrical signals the same.

In order to secure a sufficient coupling capacity, the range of possible movement of the movable element preferably is set such that the right ends of the extraction electrodes 12a, 12b cover the reference position electrodes 13a, 13b, and cannot extend farther to the right. FIG. 7 shows the state in which the movable element 30 has been moved to the right end of the range of possible movement.

Next, in the position detection device 1 described above, the configurations and the operations of a supply circuit formed by blocks 41-44 that generate electrical signals and supply same to each signal electrode 11 and of a detection circuit formed by blocks 41, 45-51 that detect the position of the movable element 30 on the basis of electrical signals from the extraction electrodes 12a, 12b and the reference position electrodes 13a, 13b in accordance with said signals will be described with reference to FIG. 5.

The constituent blocks 41-51 of the position detection device 1 shown in FIG. 5 can be all mounted on the substrate 10, or a portion may be mounted on the substrate 10 and the rest mounted on a separate substrate. In addition, each of the blocks indicated by the square frame in FIG. 5 can be respectively configured from a dedicated circuit, or the functions thereof may be realized by executing a required program with a processor. The position detection devices 1 comprises, for example, a counter 41, a waveform table 42, a pair of output circuits 43, 44, a differential amplifier 45, a comparator 46, the phase difference detector 47, a level determination unit 48, a loopback control unit 49, the correction table 50, and a filter 51.

Of the above, the counter 41 counts a prescribed free-running clock signal (for example, several MHz to several tens of MHz) and outputs a count value, which is the phase of the electrical signal that is supplied to the signal electrode 11. For example, in the case of a 7-bit counter, the count from 0 to 127 is repeated, and the frequency thereof becomes several tens of kHz to several hundreds of kHz. The count values of the counter 41 are such that, for example, 0 corresponds to 0°, 32 corresponds to 90° 64 corresponds to 180° and 96 corresponds to 270°, which are supplied to the waveform table 42 and the phase difference detector 47.

The waveform table 42 stores sample values of sine waves corresponding to at least ¼ cycle, and, taking the count value from the counter 41 as the phase, generates a sample value of a sine wave (sin) and a cosine wave (cos) at the phase. The waveform table 42 outputs a cos sample value to the output circuit 43, and a sin sample value to the output circuit 44.

The output circuits 43, 44 convert the respective input sample values into analog signals, amplify the analog signals with positive phase and the reverse phase of the positive phase and output same. The analog signals of each phase from the output circuits 43, 44 pass through the wiring 15 and the terminal 20 of the respective corresponding phase and are supplied to the signal electrode 11.

A reverse phase cosine wave (−cos) of the fourth phase (+270°) is output from the inverting output of the output circuit 43 to the fourth electrode 11d, and a positive phase cosine wave (cos) of the second phase (+90°) is supplied from the non-inverting output to the second phase electrode 11b. In addition, a positive phase sine wave (sin) of the third phase (+180°) is output from the non-inverting output of the output circuit 44 to the third phase electrode 11c, and a reverse phase sine wave (−sin) of the first phase (+0°) is supplied from the inverting output to the first phase electrode 11a.

Next, the differential amplifier 45 outputs a difference signal that is the difference between the electrical signal from the extraction electrode 12a and the electrical signal from the extraction electrode 12b. The extraction electrode 12a side is positive, and the extraction electrode 12b side is negative.

The comparator 46 outputs a pulse signal to the phase difference detector 47 at the time at which the output of the differential amplifier 45 changes from negative to positive.

The phase difference detector 47 latches the count value of the counter 41 at the time at which the pulse signal is input from the comparator 46 and supplies the difference between the latched count value and a reference count value Ref to the loopback control unit 49 as the phase difference Pa. The differential amplifier 45, the comparator 46, and the phase difference detector 47 correspond to the detection circuit.

For example, when the movable element 30 is at the starting position of the first area, that is, at the position where the center of the first opposing portion 33a overlaps the center of the first phase electrode 11a, the phase count value that is latched by the pulse signal from the comparator 46 is taken as the reference count value. In such a case, since the first phase is −sin, this signal changes from negative to positive at the time that the phase is 180° and the reference count value is 64. Thus, 64 should be subtracted from the latched count value. In addition, by associating a count value of 0 with 180°, it is possible to set the reference count value of the first phase to 0, and this subtraction can be omitted. Furthermore, it is possible to use another phase (for example, third phase) as the reference instead of the first phase.

In contrast, for example, when the movable element 30 is at the position at which the center of the first opposing portion 33a overlaps the center of the second phase electrode 11b, the second phase is cos; therefore, this signal changes from negative to positive at the time that the phase is 270°. In this case, the latched count value is 96, and by subtracting 64, the phase difference Pa becomes 32 (+90°). The phase difference Pa is, for example, 0 when the signal electrode 11 that opposes the first opposing portion 33a is the first phase, 32 when it is the second phase, 64 when it is the third phase, and 96 when it is the fourth phase.

The level determination unit 48 determines whether the intensity of the electrical signal from the reference position electrode 13a is at least a prescribed value, sets a signal A6, which indicates that the movable element 30 is in "Area6," to "1" if greater and to "0" if not, and outputs this signal to the loopback control unit 49.

The loopback control unit 49 calculates the absolute position Ps of the movable element 30 based on the phase difference Pa from the phase difference detector 47 and the signal A6 from the level determination unit 48 by using a process that is described below using FIG. 8.

The correction table 50 corrects the absolute position Ps that is calculated by the loopback control unit 49. Because the relationship between the position of the movable element 30 and the phase of the electrical signals from the extraction electrodes 12a, 12b is not completely linear, the correction table is used to restore linearity.

The correction table 50 can be disposed in front of the loopback control unit 49 to correct the phase difference Pa from the phase difference detector 47 to be positionally linear.

The filter 51 removes abrupt changes from the corrected absolute position due to the correction table 50. This removal can be carried out by using low-pass filtering that passes the low frequencies or by averaging the data for a prescribed period of time. Other appropriate methods may be employed.

The output of the filter 51 is output from the position detection device 1 as the position PD of the movable element 30.

If there is a plurality of substrates 10, the configuration should be such that the supply circuits 41-44 shown in FIG. 5 input electrical signals of four phases to the plurality of substrates 10 in parallel, and the detection circuits 41, 45-51 receive the plurality of electrical signals from the extraction electrodes 12a, 12b of the plurality of substrates 10 in parallel and process them by using time-division, in order to detect the position of the movable element 30 on each substrate 10.

The position detection process that is executed by the loopback control unit 49 will now be described with reference to FIG. 8. FIG. 8 is a flowchart of the process. When a phase difference Pa is input from the phase difference detector 47, the loopback control unit 49 acquires the signal A6 at that point in time and starts the process shown in the flowchart of FIG. 8. It should be noted that t is the activation count of the process of FIG. 8, and in FIG. 8, (t) is newly acquired data this time, and (t−1) is data that was saved at the time of the previous process of FIG. 8.

Figure 8:
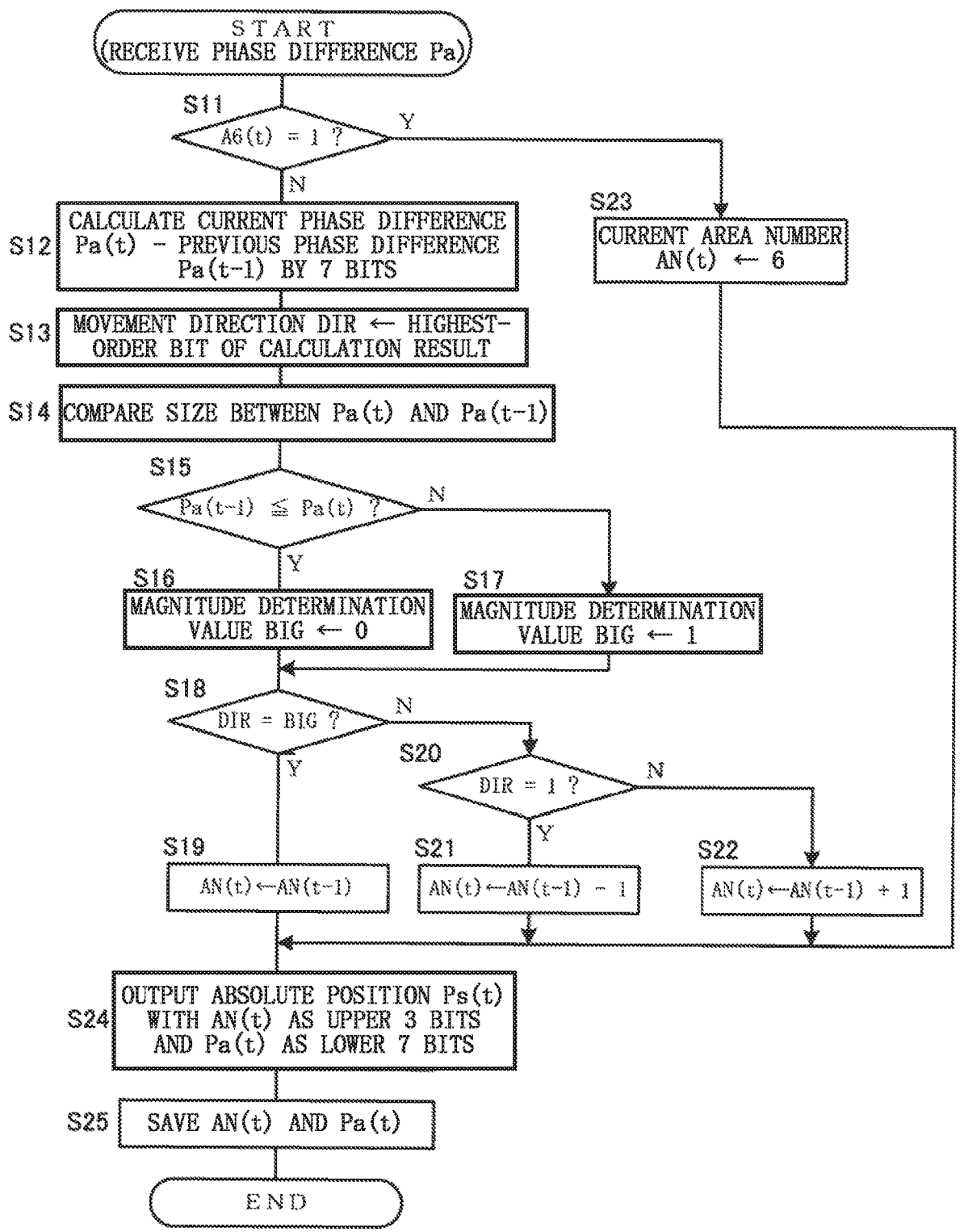
FIG. 8 is a flowchart of a process that is executed by a loopback control unit shown in FIG. 5.

In the process of FIG. 8, the loopback control unit 49 first determines whether the value of the present signal A6(t) is "1" (S11). If the determination is No, the process proceeds to Step S12 and the subsequent steps, in order to determine whether there has been movement of the movable element 30 that crosses areas between the time of the previous process and the present process.

Here, the loopback control unit 49 first calculates the difference between the present phase difference Pa(t) and the previous phase difference Pa(t−1) in 7 bits (S12). Because phase differences Pa are all 7-bit data, the calculation finds the difference and discards the overflow bits.

Next, the loopback control unit 49 assigns the value of the highest-order bit of the subtraction result of Step S12 to the movement direction DIR (S13).

In this embodiment, the signal cycle is adjusted so that the phase of the detection signal does not vary by ½ cycle or more within one cycle of the four-phase signal. Therefore, when a difference of ½ cycle or more, that is, a difference of 64 or more wherein the highest-order bit is "1," is obtained in the calculation of Step S12, the phase difference Pa can be considered not to have actually increased, but rather to have decreased by crossing 0. In addition, when the difference value is negative, the highest-order bit is also "1".

However, when the difference is minus 64 or less, the highest-order bit is "0." In this case, in the same manner as when the difference is 64 or more, the phase difference Pa has not actually decreased, but rather has increased by crossing 0.

In either case, when it can be considered that the phase difference Pa has changed in an increasing direction (the movable element 30 has been moved rightward in FIG. 5), the value of the movement direction DIR is "0," and when it is thought that the phase difference Pa has changed in a decreasing direction (the movable element 30 has been moved leftward in FIG. 5), the value of the movement direction DIR is "1."

Next, the loopback control unit 49 compares the current phase difference Pa(t) with the previous phase difference Pa(t−1) (S14). If Pa(t) is the same or greater, "0" is assigned to the value of magnitude determination value BIG (S15, S16), and if Pa(t) is smaller, "1" is assigned to the value of BIG (S17).

The foregoing processing simply compares the magnitude of numerical values, and may be achieved by a bit-by-bit comparison of both starting with the most-significant bits, and setting the bit value of Pa(t−1) as the value of BIG when the two differ the first time. In addition, if the two remain the same until the end, the BIG value is set to "0."

Consequently, if the values of DIR and BIG are both "0" and both "1," it can be considered that the movable element 30 has not moved across the areas. This is because the movement direction and the increase/decrease of the phase difference Pa are commensurate. In this case, (Yes in S18), the loopback control unit 49 does not change the area number AN from the previous number (S19).

In addition, if DIR is "1" and BIG is "0," there has been movement in a direction in which the phase difference Pa decreases, and the numerical value of the phase difference Pa has increased, so that it can be seen that a carry down has occurred, that is, that the movable element 30 has moved to an area in which the area number is one less. In this case (Yes in S20), the loopback control unit 49 decrements the area number AN by one with respect to the previous area number (S21).

If DIR is "0" and BIG is "1," there has been movement in a direction in which the phase difference Pa increases and the numerical value of the phase difference Pa has decreased, so that it can be seen that a carry up has occurred, that is, that the movable element 30 has moved to an area in which the area number is one greater. In this case (No in S20) the loopback control unit 49 increments the area number AN by one with respect to the previous value (S22).

In the case of Yes in Step S11, because it can be considered that the movable element 30 is in the position of "Area6," the value of the current area number An(t) is set to "6" (S23).

In all cases of Steps 319 and 321-S23, the loopback control unit 49 outputs an absolute position Ps(t) in which the currently calculated AN(t) occupies the upper 3 bits and the current phase difference Pa(t) occupies the lower 7 bits (S24), stores An(t) and Pa(t) for reference during the next process (S25), and ends the process.

With the foregoing processing, the loopback control unit 49 is able to generate and output the absolute position Ps(t). More specifically, the entire scale, that is, the range of possible movement of the movable element 30, is divided into a plurality of areas; the absolute position within each area is obtained by using four-phase signal electrodes 11 for each area; the cumulative value of movements across areas is detected on the basis of the time change; and the absolute position in the entire scale can be obtained from the absolute position within the area and the cumulative value.

In the foregoing processing, in the case of Yes in Step S11, by referencing the signals from the phase difference detector 47 and the level determination unit 48, the loopback control unit 49 is able to detect that the movable element 30 is in a specific position in "Area6" (position corresponding to the phase difference Pa(t)) on the basis of the intensity of the electrical signal that is generated in the reference position electrode 13a and the phases of the electrical signals that are generated in the movable element electrodes 32a, 32b and the extraction electrodes 12a, 12b in accordance with the supply of electrical signals to the signal electrode 11. This detection sequence is the first detection sequence, and this detection function is the function of the first detection circuit.

Additionally, overall, the processing of FIG. 8 is for detecting the movement amount and position of the movable element 30 based on the phases of the electrical signals that are generated in the movable element electrodes 32a, 32b and the extraction electrodes 12a, 12b in accordance with the supply of electrical signals to the signal electrode 11. This detection sequence is the second detection sequence, and this detection function is the function of the second detection circuit.

Figure 9:
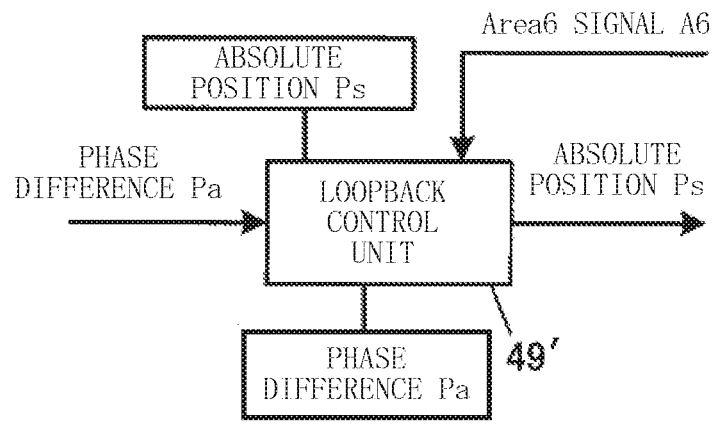
FIG. 9 is a block diagram showing a modified loopback control unit of the position detection device.
Figure 10:
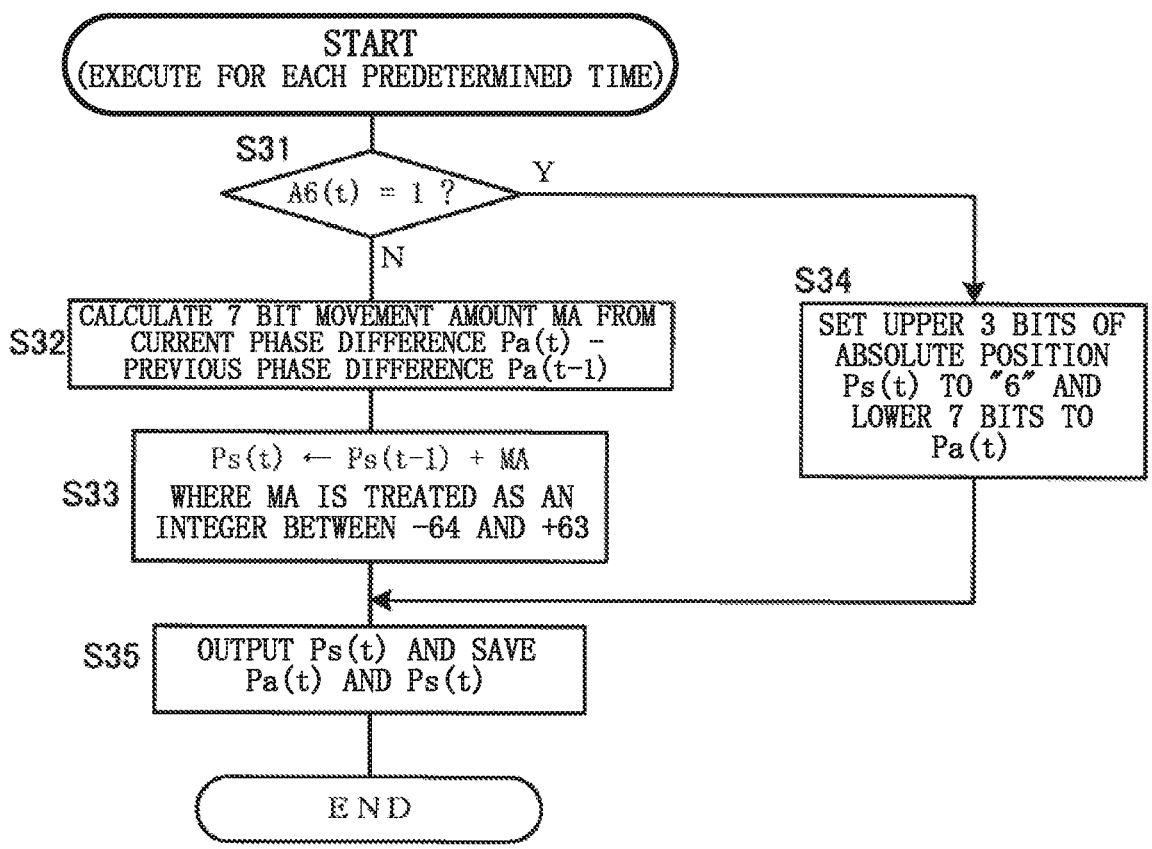
FIG. 10 is a flowchart of a process that is executed by the loopback control unit shown in FIG. 9.

Modification of the Loopback Control Unit: FIGS. 9 and 10

Next, various modifications of the above-described embodiment will be described.

First, a modification of the loopback control unit will be described.

FIG. 9 shows the configuration of the loopback control unit 49' according to this modification.

The loopback control unit 49' shown in FIG. 9 is different from the loopback control unit 49 of FIG. 5 in that it calculates the absolute position Ps based on only the movement amount MA calculated from the phase difference Pa, without directly using the phase difference Pa outside of area 6.

More specifically, the loopback control unit 49' executes the position detection process of FIG. 10 instead of the position detection process of FIG. 8.

When a phase difference Pa is input from the phase difference detector 47, the loopback control unit 49' acquires the Area6 signal A6 at that point in time and starts the process shown in the flowchart of FIG. 10.

In the process of FIG. 10 the loopback control unit 49' first determines whether the value of the present signal A6(t) is "1" (S31). If the determination is No, the loopback control unit 49' first calculates the difference between the current phase difference Pa(t) and the previous phase difference Pa(t−1) with 7 bits and sets that value as the movement amount MA (S32). This calculation is the same as Step S12 in FIG. 8. Next, the loopback control unit 49' adds the movement amount MA obtained in Step S32 to the previous absolute position Ps(t−1) to obtain the present absolute position Ps(t) (S33). However, the 7-bit movement amount MA is treated as an integer from −64 to +63. That is, a number for which the most-significant bit is "1" is added to form a negative number.

Additionally, in the case of Yes in Step S31, because it can be considered that the movable element 30 is in the position of "Area6" in the same manner as in the case of Yes in Step S11 in FIG. 8, it is possible to generate the present absolute position by setting the value of the upper 3 bits of the absolute position Ps(t) to "6," which indicates "Area6," and setting the value of the lower 7 bits to Pa(t) (S34).

In any case, the generated absolute position Ps(t) is output, Pa(t) and Ps(t) are stored for reference during the next process (S35), and the process is ended.

It is possible to calculate the absolute position Ps(t) in the same manner as in the process of FIG. 8 with the process described above.

In the process of FIG. 10 as well, the process in the case of Yes in Step S31 is the process of the first detection sequence, and a process relating to the function of the first detection circuit. In addition, overall, the process is a process of the second detection sequence, and a process relating to the function of the second detection circuit.

Figure 11:
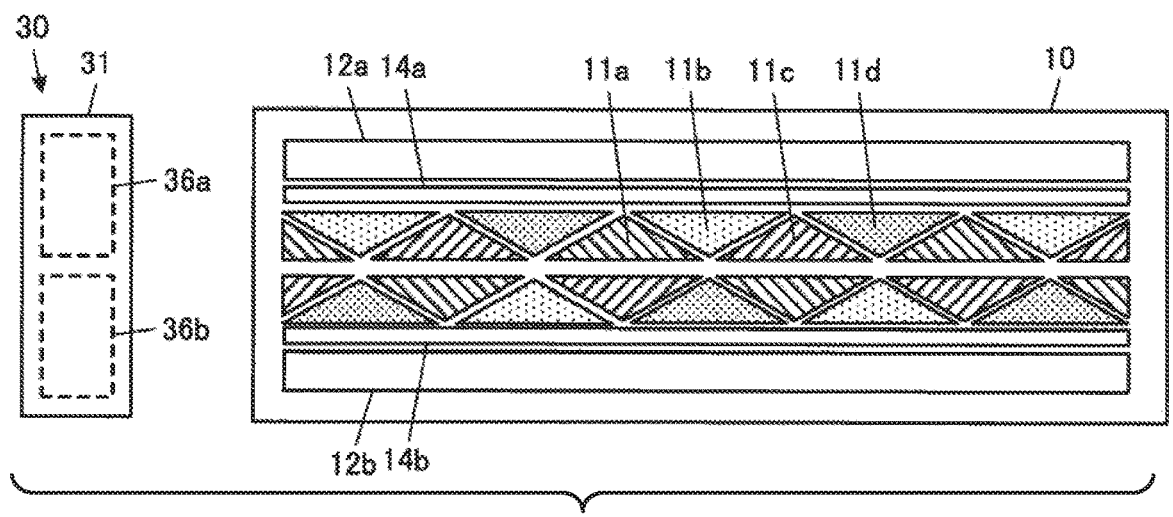
FIG. 11 is a top plan view of a position detection device showing a first modification of a signal electrode and a movable element electrode.
Figure 12:
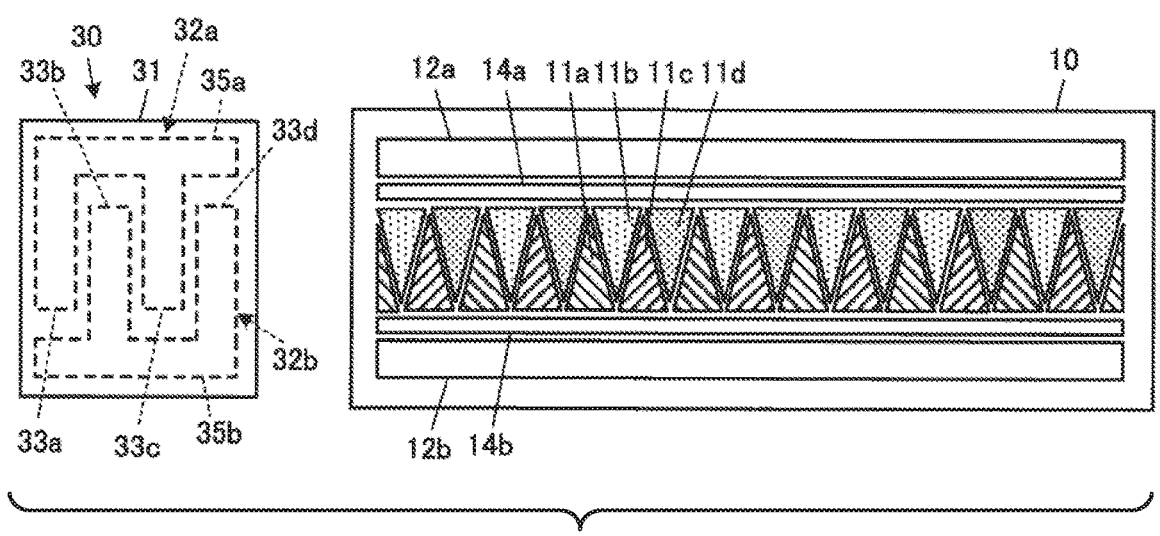
FIG. 12 is a top plan view of the position detection device showing a second modification of a signal electrode and a movable element electrode.

Modification of the Signal Electrode: FIGS. 11 and 12

Next, a modification of the shape and arrangement of the signal electrode 11 will be described. The shape and arrangement of the electrodes provided on the movable element 30 side also change in accordance with a change in the shape of the signal electrode 11.

FIGS. 11 and 12 respectively show the electrodes on the movable element 30 side and the signal electrode 11 according to different modifications. In these drawings, the same reference symbols are used for locations that correspond to the above-described embodiment. In addition, the hatching applied to the electrodes indicate the phase of the electrode, in the same manner as in the above-described embodiment. The same shall apply to each of the modifications described below.

In the first modification shown in FIG. 11, the signal electrode 11 of each phase is formed in a triangular shape, the signal electrodes 11 of opposite phase are arranged in mutually line-symmetric positions, and the lateral center line in the drawing in the area where the signal electrodes 11 are arranged is the axis of symmetry. For example, a third phase electrode 11c is disposed in a position that is symmetrical to the first phase electrode 11a, and a fourth phase electrode 11d is disposed in a position that is symmetrical to the second phase electrode 11b. On both the upper side and the lower side of the axis of symmetry, four-phase signal electrodes 11 are arranged one-dimensionally in repeating fashion along the movement direction of the movable element 30. As long as the signal electrodes 11 are arranged along some type of line it is considered to be "one-dimensional", regardless of whether the line is straight or curved. A plurality of rows may be used, as in this example.

Corresponding to the electrodes 11, 12 on the substrate 10 side, movable element electrodes 36a, 36b of corresponding size are disposed on the movable element 30 side. The movable element electrode 36a is capacitively coupled to the extraction electrode 12a and the signal electrode 11 arranged on the upper row in the drawing. The movable element electrode 36b is capacitively coupled to the extraction electrode 12b and the signal electrode 11 arranged on the lower row in the drawing.

As described above, because signal electrodes 11 of opposite phase are arranged in mutually line-symmetric positions, signals of opposite phase are induced in the movable element electrodes 36a, 36b in accordance with the supply of electrical signals of each phase to the signal electrodes 11, and it is possible to amplify the signals by taking the difference between the two signals, in the same manner as in the case of the above-described embodiment.

In FIG. 11, the movable element electrode 36a is always opposite to two or three signal electrodes 11. However, the phase of the sum total of the electrical signals that are induced in the movable element electrode 36a substantially matches the phase of the signal obtained by adding the electrical signals of opposing signal electrodes 11 by weighting according to the opposing area. Because the signal electrodes 11 are triangular, the phase of the electrical signal changes more linearly with respect to the position of the movable element. That the phase of the electrical signal induced in the movable element electrode 36a gradually changes in conjunction with the movement of the movable element 30 is the same as in the above-described embodiment.

In the same manner as the above-described embodiment, due to capacitive coupling of the movable element electrode 36a, it is possible to extract the electrical signal induced in the extraction electrode 12a and to detect the position of the movable element 30 from the phase thereof.

Next, in the second modification shown in FIG. 12, the signal electrode 11 for each phase has the form of an isosceles triangle, where the triangles are arranged in one-dimensional, alternating fashion. The movable element electrodes 32a, 32b on the movable element 30 side are the same as those shown in FIG. 4, and the thickness of each opposing portion 33a-33d is substantially the same as the length of the base of the signal electrode 11. For example, when the first opposing portion 33a substantially overlaps the base of a given second phase electrode 11b, the third opposing portion 33c overlaps the base of the next second phase electrode 11b.

With the configuration described above as well, the movable element electrode 32a and the movable element electrode 32b oppose signal electrodes 11 of opposite phase, and an electrical signal having a phase in accordance with the position of the movable element 30 is induced. Therefore, in the same manner as the case of the above-described embodiment and first modification, it is possible to extract the electrical signals induced in the extraction electrodes 12a, 12b in accordance with the electrical signals induced in the movable element electrodes 32a, 32b and to detect the position of the movable element 30 by detecting the phase thereof.

Figure 13:
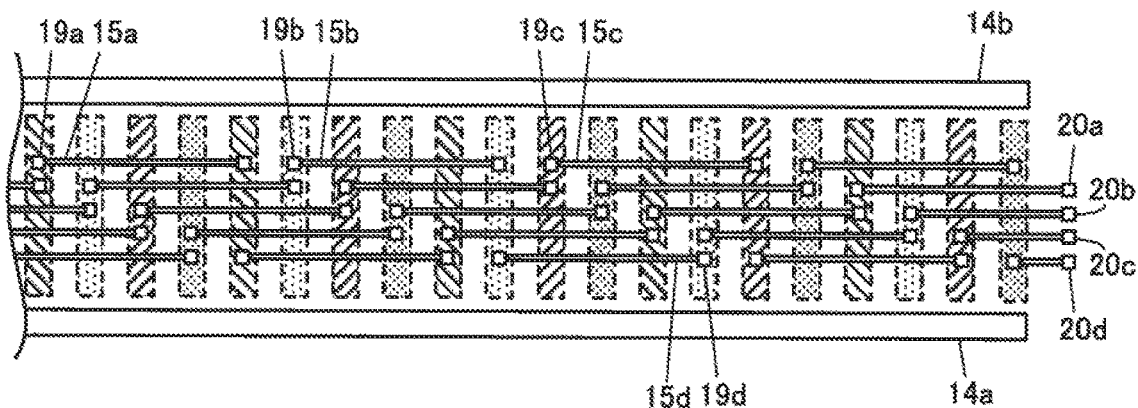
FIG. 13 is a top plan view of the position detection device showing a first modification of a wiring electrode.
Figure 14:
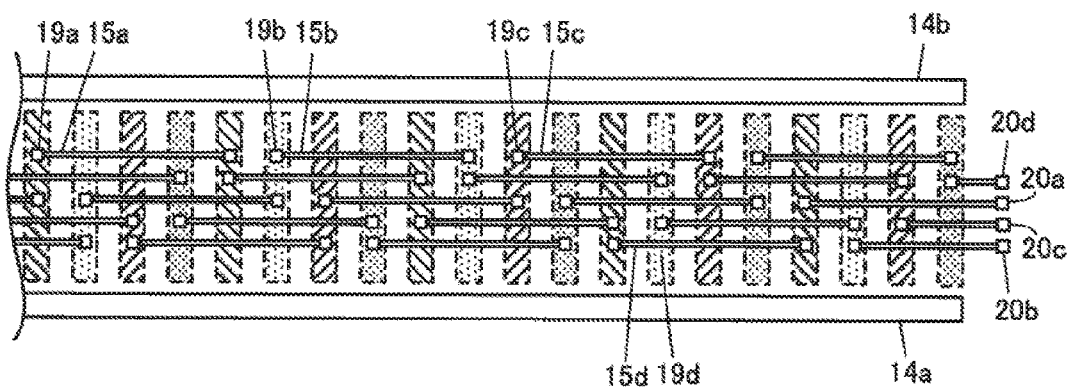
FIG. 14 is a top plan view of the position detection device showing a second modification of a wiring electrode.

Modification of the Wiring Electrode: FIGS. 13 and 14

Next, a modification of the shape and arrangement of the wiring 15 will be described.

FIGS. 13 and 14 respectively show the electrodes on the movable element 30 side and the signal electrode 11 according to different modifications. Although the figures show the arrangement of the wiring 15 and the via 19, in the same manner as FIG. 3, only the inside portions of the air gaps 14a, 14b are shown.

In FIG. 3, the wiring 15 is partially oblique with respect to the arrangement direction of the signal electrodes 11 (movement direction of the movable element 30), and the wiring 15 of each phase has been moved close to or away from the extraction electrode 12, in accordance with the position in the arrangement direction of the signal electrode 11.

However, even if the wiring 15 is arranged so as to be always parallel to the arrangement direction of the signal electrodes 11, it is possible to electrically connect the two wirings 15 on the left and right using two of the vias 19 at the signal electrode (refer to FIG. 2 and FIG. 3). That is, at each electrode it is possible to change the distance of the wiring 15 of each phase from the extraction electrode 12.

For example, the wiring 15 and via 19 for each phase may be arranged in the order shown in FIG. 13, or as shown in FIG. 14.

Regardless of the arrangement, the effect described in the embodiment above can be achieved with a configuration such that wires 15 of different phase arrive at positions closest to the extraction electrode 12, among the four-phase wirings 15, in accordance with the position in the arrangement direction of the signal electrode 11, and such that the wiring 15 of each phase is in a position closest to the extraction electrode 12, among the four-phase wirings 15, at intervals that are substantially equal in length when viewed in the arrangement direction of the signal electrodes 11.

Embodiment of the Parameter Control Device: FIGS. 15 to 19

Figure 15:
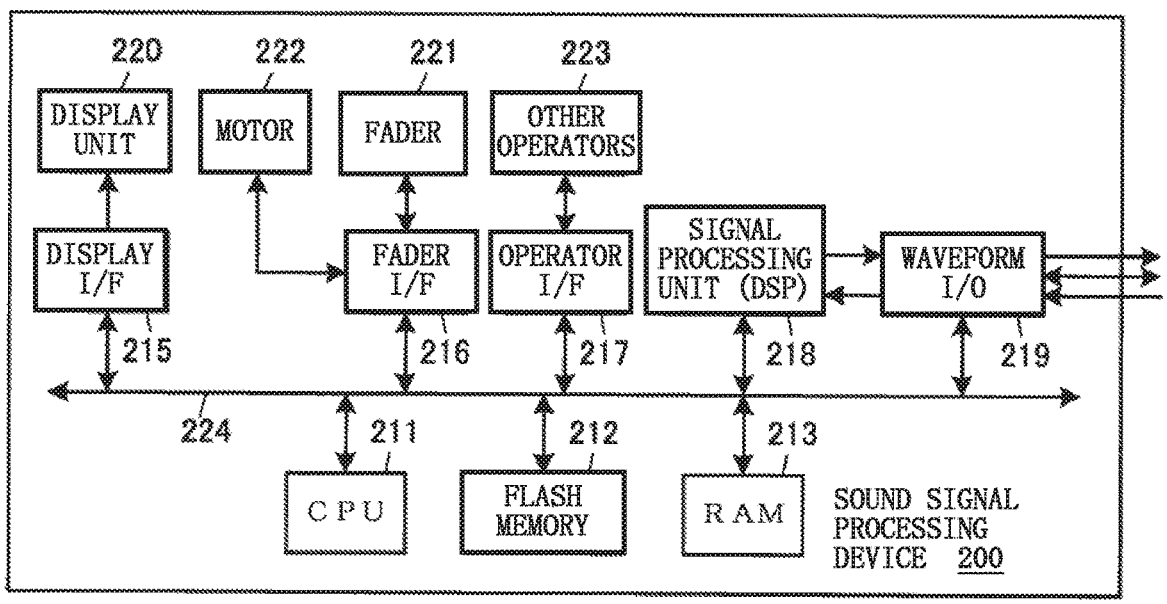
FIG. 15 is a block diagram showing the hardware configuration of a sound signal processing device, which is one embodiment of a parameter control device including the position detection device.

Next, an embodiment of a parameter control device that includes the position detection device of the present invention will be described. FIG. 15 is a block view showing the hardware configuration of a sound signal processing device, which is one embodiment of a parameter control device including the position detection device according to the present invention.

The sound signal processing device 200 shown in FIG. 15 comprises a CPU 211, a flash memory 212, RAM 213, a display I/F 215, a fader I/F 216, an operator I/F 217, a signal processing unit (DSP) 218, and a waveform input/output circuit (I/O) 219, which are connected by a system bus 224. In addition, a display unit 220 is connected to the display I/F 215, and a fader 221 and a motor 222 are connected to the fader I/F 216. Also, other operators 223 are connected to the operator I/F 217.

With regard to the configuration shown in FIG. 15, the CPU 211 is an electronic controller that is configured to control the operation of the entire sound signal processing device 200 and performs various functions, including control of the circuit shown in FIG. 5, by executing the required program stored in the flash memory 212 to control the required hardware.

The flash memory 212 is a rewritable non-volatile storage device for storing control programs, etc., that are executed by the CPU 211.

The RAM 213 is a computer storage device for temporarily storing data and for use as a work memory of the CPU 211.

The display unit 220 can be configured from, for example, a liquid-crystal panel (LCD) or a light-emitting diode (LED). The display I/F 215 is an interface that makes it possible to control the display of the display unit 220 from the CPU 211.

The fader 221 is an operating unit that includes a plurality of slider operators that are for receiving operations with respect to the sound signal processing device 200 and that correspond to the movable element 30 of the above-described embodiment. The movable element 30 is provided with a plurality of knobs 221a (refer to FIG. 16) for the user to grasp and operate. In addition, the motor 222 is a drive source operatively coupled to the movable element 30. The drive source motor 222 (e.g., the motor 222) is arranged to move the movable element 30, including the knobs 221a, with respect to the fixed element (e.g., the substrate 10).

The fader I/F 216 is an interface that makes it possible for the CPU 211 to detect an operation with respect to the fader 221, and that corresponds to a circuit for detecting the position of the movable element 30 in FIG. 5. Furthermore, the fader I/F 216 is an interface that makes it possible for the movable element 30, including the knobs 221a, to be moved in an arbitrary direction by controlling the motor 222 by the CPU 211.

The other operators 223 may be configured from various keys, buttons, rotary encoders, touch panels, and the like. The operator I/F 217 is an interface to enable the CPU 211 to detect operations of the other operators 223.

The DSP 218 is a sound signal processing device that applies signal processing, such as mixing and equalizing, to digital sound signals supplied from the waveform I/O 219 and that again outputs processed sound signals to the waveform I/O 219.

The waveform I/O 219 is an interface for receiving input sound signals to be processed by the DSP 218 and outputting the processed sound signals.

Such a sound signal processing device 200 can be configured, for example, as a digital mixer, and also as a synthesizer, recorder, electrical instrument, or the like.

Figure 16:
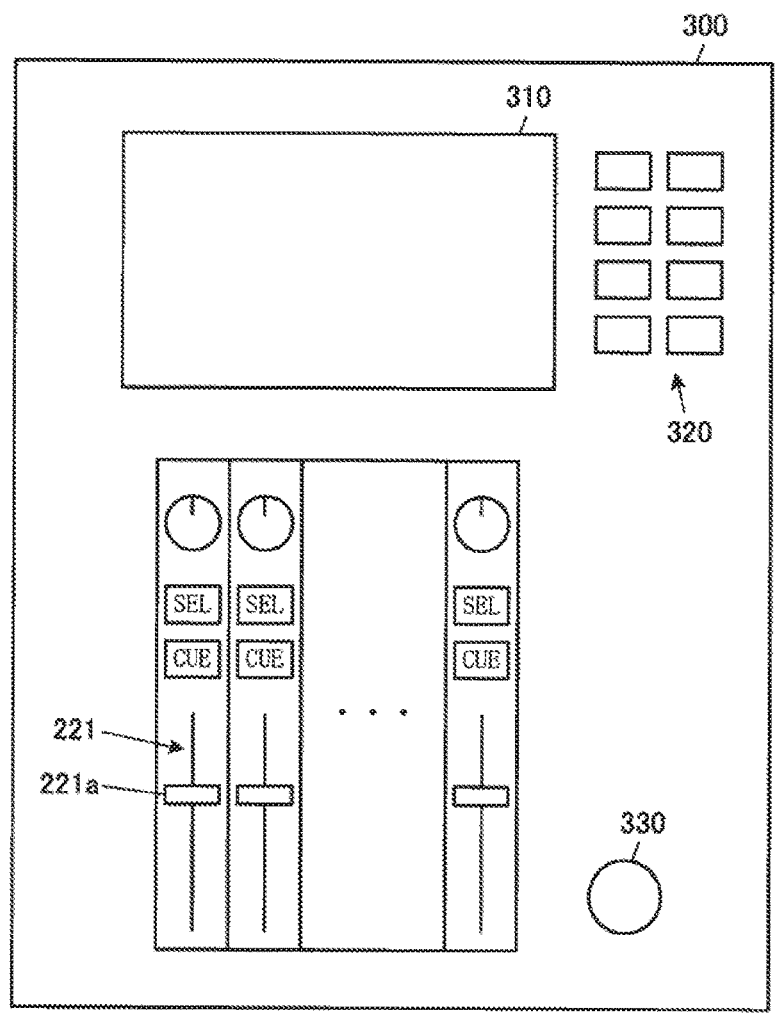
FIG. 16 is an overall schematic view of an operation panel provided to the sound signal processing device shown in FIG. 15.

Next, FIG. 16 shows a schematic overview of an operation panel equipped with the sound signal processing device 200 shown in FIG. 15.

As shown in FIG. 16, various display units such as a display 310, and various operators such as a button group 320 and a rotary encoder 330 are provided on the operation panel 300 for the sound signal processing device 200.

Among the above, a slider operator, such as the fader 221, can be configured as the position detection device 1 that includes the movable element 30, as described in the embodiment or modification described above. In addition, although a plurality of faders 221 are arranged on the operation panel 300, the plurality of faders 221, including the circuit for detecting panel operations, may be configured as position detection devices that comprise a plurality of substrates 10 and movable elements 30 and that detect the position of each movable element 30 on the corresponding substrate 10. Of course, the entire sound signal processing device 200 may be regarded as a position detection device.

In regard to the fader 221, the knob 221a that the operator actually touches may be the movable element 30 itself, or may be integrated with the movable element 30 or configured by fixing another part to the movable element 30.

Figure 17:
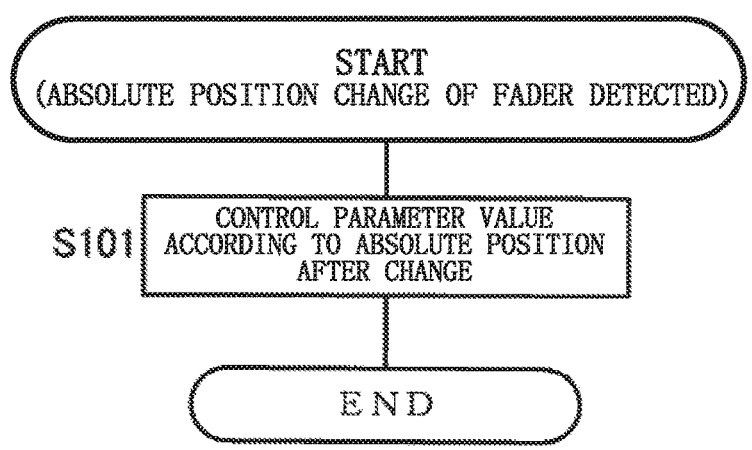
FIG. 17 is a flowchart of a process that is executed by the electronic controller (CPU) of the sound signal processing device shown in FIG. 15.

Next, FIG. 17 shows a process that is executed when the CPU 211 detects a change in the absolute position of the fader 221.

The CPU 211 constantly detects the absolute position of the movable element 30 (knob 221a) in each fader 221 within the range of possible movement, by using the circuit described using FIG. 5, and when a change in the absolute position in any of the faders 221 is detected, controls, by using the process of FIG. 17 (S101), the value of a prescribed parameter assigned to the fader in accordance with the changed absolute position. This control can be arbitrary, such as increasing/decreasing a value, toggling the on/off value, switching the operation mode, etc., which may be appropriately determined.

Figure 18:
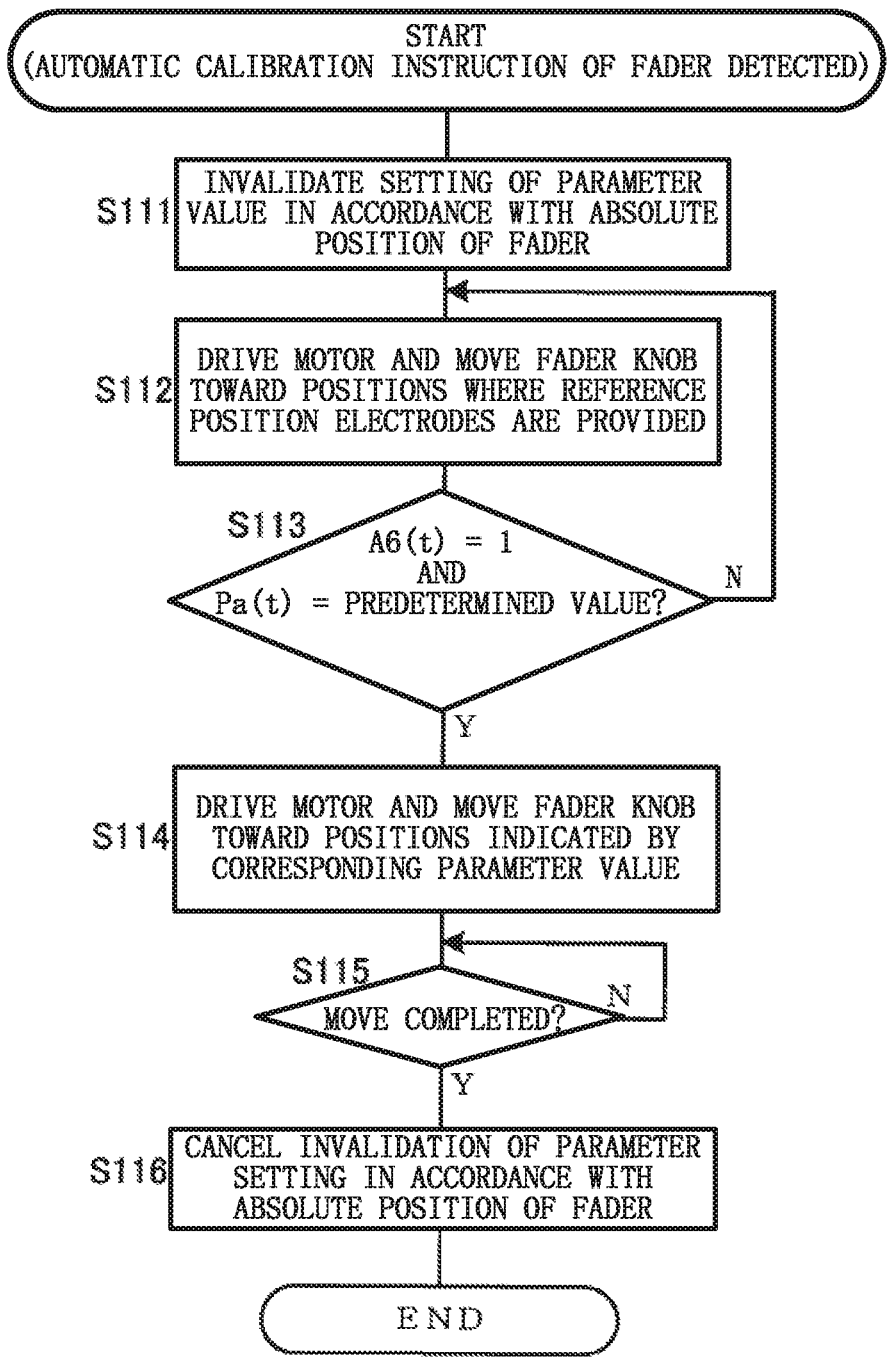
FIG. 18 is a flowchart of another process executed by the electronic controller of the sound signal processing device.

Next, FIG. 18 shows a process that is executed when the CPU 211 detects an automatic calibration (calibration) instruction.

When an instruction to carry out automatic calibration of the fader 221 is detected on the basis of an operation of the button group 320 by the user or an occurrence of a prescribed event, etc., the CPU 211 starts the process shown in the flowchart of FIG. 18.

In this process, the CPU 211 first invalidates the setting of the parameter value according to the absolute position of the fader due to the process of FIG. 17 (S111). This process is an invalidation procedure and corresponds to the function of an invalidating process of the electronic controller (e.g., the CPU 211).

Next, the CPU 211 drives the motor 222 and moves the knob 221a of the fader 221 toward the position where the reference position electrode 13a is provided (S112).

Thereafter, the movement is continued until the movable element electrode 32a opposes the reference position electrode 13a and the signal A6(t) detected by the loopback control unit 49 becomes "1," and Pa(t) becomes a prescribed value (S113). If the signal A6(t) is "1," the absolute position of the movable element 30 on the substrate 10 can be uniquely determined (calibrated) according to the process of FIG. 8, FIG. 10, etc., from A6(t) and Pa(t). Then, with the position at the time of calibration as the position detection reference, it is possible to detect a subsequent absolute position of the movable element 30 by using the process of FIG. 8, FIG. 10, etc. Here, considering the measurement reliability, a position at which the movable element electrode 32a opposes the reference position electrode 13a with sufficient area so that "1" can be stably obtained as A6(t) is used as the prescribed value of Pa(t). However, it is also conceivable to accept Yes in Step S113 if A6(t) is "1," without reference to the value of Pa(t).

If Yes in Step S113, the CPU 211 drives the motor 222 and moves the knob 221a of the fader 221 to the position indicated by the parameter value corresponding to the fader 221 (S114). This operation is performed to return the knob to a position for setting the parameter value, since it was possible to set a position detection reference for position detection.

Then, when the movement is completed (S115), the CPU 211 cancels the invalidation of the setting of the parameter value according to the absolute position of the fader carried out in Step S111 (S116) and ends the process of FIG. 18.

According to the process described above, it is possible to automatically set a reference for position detection of the knob 221a of the fader 221. Therefore, even if a malfunction occurs during the detection of the absolute position by using the process of FIG. 8, FIG. 10, etc., due to noise, or the like, it is possible to carry out the position detection of "Area6," with which it is possible to specify the absolute position regardless of the difference, and return to a state in which position detection can be normally carried out. In addition, even if the position of the knob 221a changes during this setting, the parameter value will not change accordingly; therefore, it becomes possible to carry out the setting without affecting the signal processing that is being executed.

Figure 19:
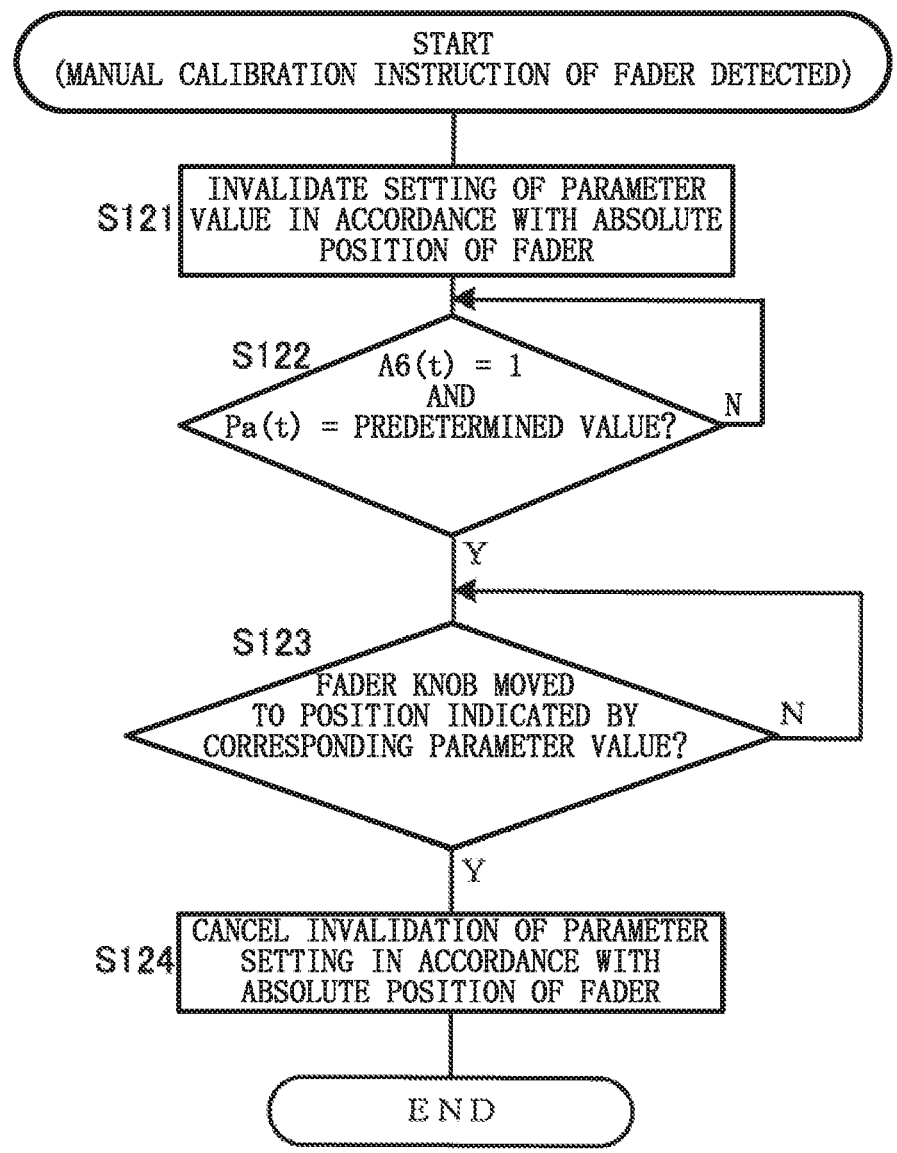
FIG. 19 is a flowchart of yet another process executed by the electronic controller of the sound signal processing device.

Although an automatic calibration process is shown in FIG. 18, manual calibration is also possible, and FIG. 19 shows a flowchart of the process for such a case. This process can also be applied to a sound signal processing device that does not include a motor 222.

In the process of FIG. 19 as well, the CPU 211 first invalidates the setting of the parameter value that is in accordance with the absolute position of the fader (S121). Next, a determination is made regarding whether the signal A6(t) is "1" and Pa(t) has reached a prescribed value (S122). This process corresponds to Step S113 of FIG. 18 and is a process for waiting until the user operates the knob 221a of the fader 221 and moves the knob to a prescribed position within "Area6" that is the position detection reference for position detection.

If the determination is Yes in Step S122, the CPU 211 next waits until the knob 221a of the fader 221 has moved to a position indicated by the parameter value corresponding to the fader 221 (S123). This process corresponds to Step S115 of FIG. 18 and is a process for waiting until the knob returns to a position for setting the parameter value after setting the position detection reference for position detection.

Then, if the determination in Step S123 is Yes, the CPU 211 cancels the invalidation of the setting of the parameter value in accordance with the absolute position of the fader carried out in Step S121 (S124) and ends the process of FIG. 19.

According to the process described above, it is possible for the user to manually operate the knob 221a of the fader 221 and to set the position detection reference for position detection without affecting the signal processing that is being executed.

Other Modifications

The foregoing concludes the description of the embodiments; however, it goes without saying that the specific configuration of the device, shape of each part, configuration of the circuit, etc., are not limited to those described in the foregoing embodiments.

For example, in the above-described embodiment, air gaps 14a, 14b are provided in one substrate 10; however, the substrate may be divided into a plurality of substrates, and air gaps may be formed therebetween at set intervals.

Figure 20:
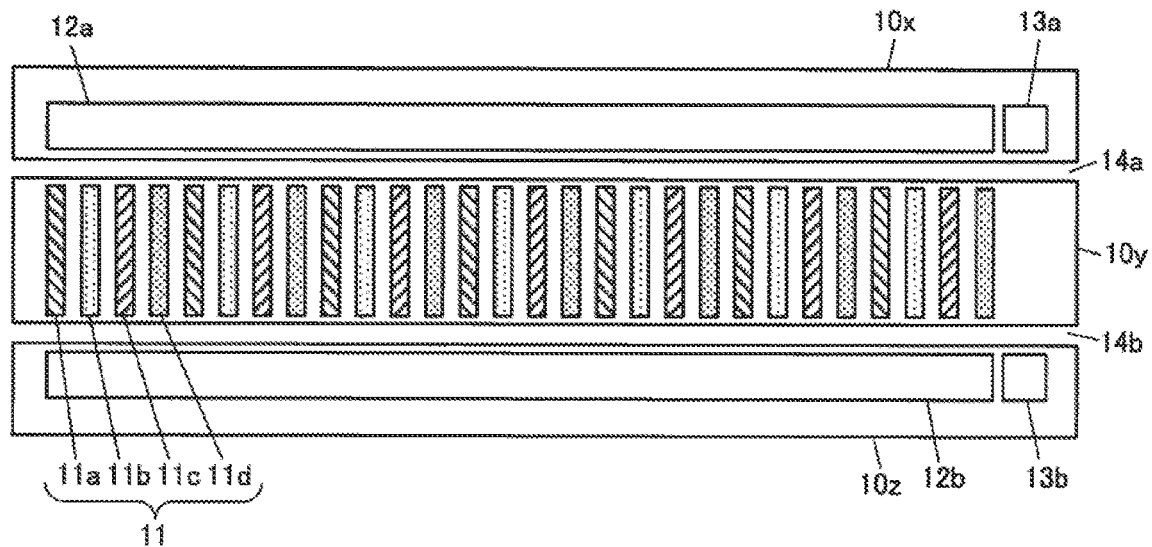
FIG. 20 is a top plan view a modified substrate for use in the position detection device.

FIG. 20 shows an example thereof. In the example of FIG. 20, the substrate, which is the fixed element, is configured by being divided into three parts, a first substrate 10x to a third substrate 10z. Then, by assembling these substrates on a support member at a set interval therebetween, an air gap 14a is formed between the first substrate 10x and the second substrate 10y, and an air gap 14b is formed between the second substrate 10y and the third substrate 10z.

The same effect as the above-described embodiment can also be achieved by such a configuration.

In addition, in the embodiment described above an example was described in which the wiring 15 and the via 19 are provided on a second surface of the substrate 10. However, the wiring 15 and the via 19 may be provided within the substrate 10.

Figure 21:
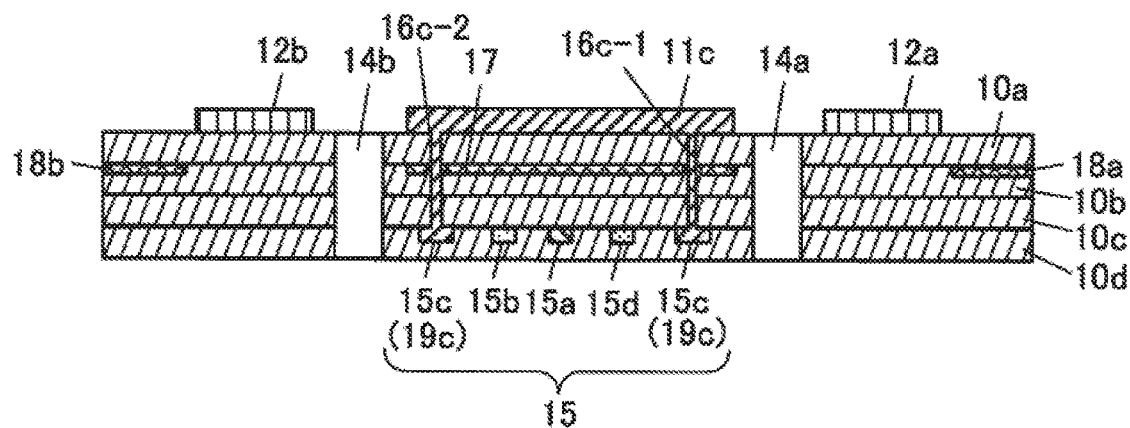
FIG. 21 is a cross-sectional view of a modified substrate corresponding to FIG. 2, a modification in which a wiring electrode is disposed within the substrate.

FIG. 21 shows an example thereof. In the example of FIG. 21, the substrate 10 has a four-layer structure with a first layer 10a to a fourth layer 10d, and the wiring 15 and the via 19 are provided below the third layer 10c. That is, they are provided within the substrate 10 and are covered by the fourth layer 10d.

The same effect as the above-described embodiment can also be achieved by such a configuration. There is also the effect that it is possible to prevent damage to the wiring 15 and the via 19.

Additionally, in the embodiment described above, the signal electrode 11 is provided on the substrate 10 side; however, it is also possible to provide the signal electrode on the movable element 30 side, and to provide a corresponding electrode on the substrate 10 side. As a specific structure of the substrate 10 side for this case, in FIG. 20, the electrode that is supplied from the signal electrode attached to the movable element 30 side is provided with an arrangement like the signal electrode 11 in FIG. 20, and each of the continuous electrodes that are supplied is connected to the extraction electrode of FIG. 20 across delay circuits, each having a different phase. In this case, the signal electrode provided on the movable element 30 side has a structure that will not affect the extraction electrode 12 to the greatest extent possible. The structure otherwise is the same as the other embodiments.

In addition, a four-phase signal electrode 11 was used in the embodiment described above; however, the same position detection of a movable element 30 is possible using any n-phase (where n is an integer of 3 or more) signal electrode 11, such as three-phase, five-phase, or more. For example, even in the case of an odd number of phases such as a three-phase, it is possible to induce opposite phase signals above and below in the movable element electrodes 36a, 36b by adopting the arrangement of the signal electrode 11 shown in FIG. 11 and shifting the arrangement of the electrodes on the upper side and the lower side by 1.5 one and a half times.

The position detection device 1 is not limited to such applications as the sound signal processing device described with reference to FIGS. 15 to 19. The device can be applied to any device that receives operations from a user. The device may be one that controls the parameter values of another device according to the detection result of an operation. It is also not necessary to use the detection result of an operation for controlling a parameter value.

In addition, the configurations and modifications described above may be appropriately combined and applied as long as they are compatible.

As is obvious from the foregoing description, it is possible to provide a position detection device that can precisely detect the relative positions of a fixed element and a movable element that moves on the fixed element, even if the range of possible movement of the movable element is increased.

What is claimed is:

1. A position detection device comprising:
a fixed element;
a movable element movably arranged relative to the fixed element;
a plurality of first electrodes arranged one-dimensionally on either the fixed element or the movable element in a plane along a movement direction of the movable element, the first electrodes including two or more phases to which are respectively supplied with electrical signals having mutually different phases;
a second electrode provided on the other one of the movable element or the fixed element to be at least partially opposed to the first electrodes;
a third electrode provided on the fixed element and opposing one of the first and second electrodes that is on the movable element while the movable element is in a prescribed position; and
a first detection circuit configured to detect that the movable element is in the prescribed position based on an intensity of an electrical signal that is generated in the third electrode and a phase of an electrical signal that is generated in the second electrode in accordance with the electrical signals supplied to the first electrodes.

2. The position detection device recited in claim 1, wherein
the third electrode is provided adjacent an end portion of an array of the first electrodes or adjacent an end portion of the second electrode.

3. The position detection device recited in claim 1, further comprising:
a second detection circuit configured to detect an amount of movement and position of the movable element based on the phase of the electrical signal that is generated in the second electrode in accordance with the electrical signals supplied to the first electrodes;
a drive source operatively coupled to the movable element; and
an electronic controller operatively coupled to the drive source, the electronic controller being configured to operate the drive source to move the movable element adjacent to the prescribed position in response to a prescribed event, and the electronic controller being configured to set a position detection reference for position detection of the movable element by the second detection circuit in accordance with a timing at which the first detection circuit detects that the movable element is in the prescribed position.

4. The position detection device recited in claim 3, wherein
the electronic controller is configured to control the driving source to move the movable element to a position indicated by a parameter value corresponding to the movable element after the position detection reference has been set,
the electronic controller is configured to change the parameter value in accordance with the position of the movable element as detected by the second detection circuit, and
the electronic controller is configured to invalidate the change in the parameter value while the movable element is being moved by the drive source.

5. The position detection device recited in claim 1, further comprising:
a second detection circuit configured to detect an amount of movement and position of the movable element based on the phase of the electrical signal that is generated in the second electrode in accordance with the electrical signals supplied to the first electrodes; and
an electronic controller configured to set a position detection reference for position detection of the movable element by the second detection circuit in accordance with a timing at which the first detection circuit detects that the movable element is in the prescribed position.

6. The position detection device according to claim 5, wherein
the electronic controller is configured to change a parameter value in accordance with the position of the movable element as detected by the second detection circuit, and
after a prescribed event is detected, the electronic controller is configured to refrain from changing the parameter value until the position detection reference is set and the movable element is then moved to a position indicated by a parameter corresponding to the movable element.

7. A position detection device comprising:
a fixed element;
a movable element movably arranged relative to the fixed element;
a plurality of first electrodes arranged on one-dimensionally either the fixed element or the movable element in a plane along a movement direction of the movable element, the first electrodes including two or more phases, to which are respectively supplied with electrical signals having mutually different phases;
a second electrode provided on the other one of the movable element or the fixed element to be at least partially opposed to the first electrodes, and the second electrode being arranged to be at least partially generate an electrical signal by the electrical signals being supplied to at least a part of the first electrodes;
a third electrode provided on the fixed element, the third electrode being arranged to be at least partially generate an electrical signal with an intensity corresponding to a distance from one of the first and second electrodes that is provided on the movable element by the electrical signals that are generated in the first and second electrodes that is provided on the movable element; and
a first detection circuit configured to detect that the movable element is in a prescribed position based on an intensity of the electrical signal that is generated in the third electrode and a phase of the electrical signal that is generated in the second electrode in accordance with the electrical signals supplied to the first electrodes.

8. The position detection device recited in claim 7, wherein
the third electrode is provided in adjacent an end portion of an array of the first electrodes or adjacent an end portion of the second electrode.

9. The position detection device recited in claim 7, further comprising:
a second detection circuit configured to detect an amount of movement and position of the movable element based on the phase of the electrical signal that is generated in the second electrode in accordance with the electrical signals supplied to the first electrodes;
a driving source operatively coupled to the movable element; and
an electronic controller configured to operate the drive source to move the movable element adjacent to the prescribed position in response to a prescribed event, and the electronic controller being configured to set a position detection reference for position detection of the movable element by the second detection circuit in accordance with a timing at which the first detection circuit that the movable element is in the prescribed position.

10. The position detection device recited in claim 9, wherein
the electronic controller is configured to control the driving source to move the movable element to a position indicated by a parameter value corresponding to the movable element after the position detection reference has been set,
the electronic controller is configured to change the parameter value in accordance with the position of the movable element as detected by the second detection circuit, and
the electronic controller is configured to invalidate the change in the parameter value while the movable element is being moved by the drive source.

11. The position detection device recited in claim 7, further comprising:
a second detection circuit configured to detect an amount of movement and position of the movable element based on the phase of the electrical signal that is generated in the second electrode in accordance with the electrical signals supplied to the first electrodes; and
an electronic controller configured to set a position detection reference for the position detection of the movable element by the second detection circuit in accordance with a timing at which the first detection circuit detects that the movable element is in the prescribed position.

12. The position detection device according to claim 11, further comprising
the electronic controller is configured to change a parameter value in accordance with the position of the movable element as detected by the second detection circuit, and
after a prescribed event is detected, the electronic controller is configured to refrain from changing the parameter value until the position detection reference is set and the movable element is then moved to a position indicated by a parameter corresponding to the movable element.

13. A position detection method for detecting a relative position of a movable element relative to a fixed element on which the movable element moves, in which a plurality of first electrodes are arranged one-dimensionally on either the fixed element or the movable element in a plane along a movement direction of the movable element, the first electrodes including two or more phases to which are respectively supplied with electrical signals having mutually different phases to which are respectively supplied with electrical signals having mutually different phases; a second electrode is provided on the other one of the movable element or the fixed element to be at least partially opposed to the first electrodes; and a third electrode is provided on the fixed element and opposing one of the first and second electrodes that is on the movable element while the movable element is in a prescribed position the position detection method comprising:
detecting that the movable element is in a prescribed position based on an intensity of an electrical signal that is generated in the third electrode and a phase of an electrical signal that is generated in the second electrode in accordance with the electrical signals supplied to the first electrodes.

14. The position detection method recited in claim 13, further comprising
detecting an amount of movement and a position of the movable element based on a phase of the electrical signal that is generated in the second electrode in accordance with the electrical signals supplied to the first electrodes; and moving the movable element adjacent to the prescribed position in accordance with a prescribed event, and setting a position detection reference for position detection of the movable element in accordance with a timing at which the movable element is detected in the prescribed position.

15. The position detection method recited in claim 14, further comprising returning the movable element to an original position after the position detection reference has been set, and changing a parameter value in accordance with the position of the movable element as detected based on the phase of the electrical signal that is generated in the second electrode in accordance with the supply of electrical signals to the first electrodes, and refraining from changing the parameter value while the movable element is being moved.

16. The position detection method recited in claim 13, further comprising detecting an amount of movement and the position of the movable element based on the phase of the electrical signal that is generated in the second electrode in accordance with the electrical signals supplied to the first electrodes; and setting a position detection reference for position detection of the movable element during detection of the amount of movement and the position of the movable element in accordance with a timing at which the movable element is detected in the prescribed position.

17. The position detection method recited in claim 16, further comprising changing a parameter value in accordance with the position of the movable element that was detected, and after a prescribed event is detected, refraining from changing the parameter value until the position detection reference is set and the movable element is then returned to the position at a time the prescribed event was detected.

* * * * *